United States Patent
Hesse et al.

(10) Patent No.: US 7,835,278 B2
(45) Date of Patent: Nov. 16, 2010

(54) MEANS AND APPARATUS FOR A SCALEABLE CONGESTION FREE SWITCHING SYSTEM WITH INTELLIGENT CONTROL III

(75) Inventors: John Hesse, Moss Beach, CA (US); Coke Reed, Austin, TX (US); David Murphy, Austin, TX (US)

(73) Assignee: Interactic Holdings, LLC, Austin, TX (US)

( * ) Notice: Subject to any disclaimer, the term of this patent is extended or adjusted under 35 U.S.C. 154(b) by 0 days.

(21) Appl. No.: 12/272,274

(22) Filed: Nov. 17, 2008

(65) Prior Publication Data

US 2009/0067837 A1    Mar. 12, 2009

Related U.S. Application Data

(63) Continuation of application No. 11/214,984, filed on Aug. 31, 2005, now abandoned.

(60) Provisional application No. 60/606,136, filed on Sep. 1, 2004.

(51) Int. Cl.
  *H04L 12/26* (2006.01)
  *H04L 12/50* (2006.01)
  *H04L 12/56* (2006.01)

(52) U.S. Cl. .................. 370/230; 370/369; 370/392

(58) Field of Classification Search ......... 370/229–235, 370/369–374, 380–383, 386–389, 392, 394, 370/400, 401
See application file for complete search history.

(56) References Cited

U.S. PATENT DOCUMENTS

| | | | | |
|---|---|---|---|---|
| 5,469,284 | A | * | 11/1995 | Haas .......................... 398/54 |
| 5,790,545 | A | | 8/1998 | Holt et al. |
| 5,841,556 | A | * | 11/1998 | Hong et al. .................. 398/46 |
| 5,959,748 | A | * | 9/1999 | Jahreis ........................ 398/56 |
| 5,996,020 | A | | 11/1999 | Reed |

(Continued)

FOREIGN PATENT DOCUMENTS

EP    1662724 A3    2/2008

OTHER PUBLICATIONS

Papadimitriou G. I. et al. "Optical Switching: Switch Fabrics, Techniques, and Architectures", Journal of Lightwave Technology, Feb. 2003, pp. 384-405, vol. 21, No. 2, IEEE, United States of America.

*Primary Examiner*—Hong Cho
(74) *Attorney, Agent, or Firm*—Keith D. Nowak, Esq.; Carter Ledyard & Milburn LLP

(57) ABSTRACT

A switching system for routing information packets that can simultaneously receive a variety of packet formats. The packet formats include electronic packet transmissions, optical wave division multiplexed data (WDM) with a single frame consisting of a plurality of packets to be sent to a common output line, with each packet traveling on a separate wavelength, WDM packets where the header of an individual packet travels on a wavelength different from the remainder of the packet (i.e. the payload) and the payload either travels on a single wavelength or is subdivided into a plurality of sub-packets with each sub-packet carried on a separate wavelength, and the like. The system includes input devices, a scheduling unit, a switching unit; and variable delay line units. A deconcentrator in the packet switching system creates a minimum gap between packets.

6 Claims, 23 Drawing Sheets

U.S. PATENT DOCUMENTS

| | | |
|---|---|---|
| 6,289,021 B1 | 9/2001 | Hesse |
| 6,556,571 B1 * | 4/2003 | Shahrier et al. .......... 370/395.4 |
| 6,687,253 B1 | 2/2004 | Hesse et al. |
| 6,721,315 B1 * | 4/2004 | Xiong et al. ................ 370/389 |
| 6,754,207 B1 | 6/2004 | Hesse |
| 6,956,861 B2 | 10/2005 | Reed et al. |
| 7,016,363 B1 | 3/2006 | Reed et al. |
| 7,142,787 B2 * | 11/2006 | Horiuchi et al. ............. 398/154 |
| 7,221,677 B1 | 5/2007 | Reed et al. |
| 2003/0161636 A1 * | 8/2003 | Ohta et al. .................. 398/166 |
| 2004/0090964 A1 | 5/2004 | Reed et al. |
| 2005/0078673 A1 * | 4/2005 | Sakamoto et al. ........... 370/389 |
| 2006/0171386 A1 | 8/2006 | Hesse et al. |

* cited by examiner

MEANS AND APPARATUS FOR A SCALEABLE CONGESTION FREE SWITCHING SYSTEM WITH INTELLIGENT CONTROL III

PRIORITY AND RELATED PATENTS AND APPLICATIONS

This is a continuation of U.S. patent application Ser. No. 11/214,984 filed Aug. 31, 2005, in the name of John Hesse, Coke Reed and David Murphy, and entitled "Means and Apparatus for a Scaleable Congestion Free Switching System with Intelligent Control III," which is based upon and claims the benefit of U.S. Provisional Application No. 60/606,136, filed Sep. 1, 2004, entitled "Means and Apparatus for a Scaleable Congestion Free Switching System with Intelligent Control III," the entirety of which is incorporated herein by reference.

The disclosed system and operating method are related to subject matter disclosed in the following patents and patent applications that are incorporated herein by reference in their entirety:

U.S. Pat. No. 5,996,020 entitled, "A Multiple Level Minimum Logic Network", naming Coke S. Reed as inventor;

U.S. Pat. No. 6,289,021 entitled, "A Scaleable Low Latency Switch for Usage in an Interconnect Structure", naming John Hesse as inventor;

U.S. patent application Ser. No. 09/693,359 entitled, "Multiple Path Wormhole Interconnect", naming John Hesse as inventor;

U.S. patent application Ser. No. 09/693,357 entitled, "Scaleable Wormhole-Routing Concentrator", naming John Hesse and Coke Reed as inventors;

U.S. patent application Ser. No. 09/693,603 entitled, "Scaleable Interconnect Structure for Parallel Computing and Parallel Memory Access", naming John Hesse and Coke Reed as inventors;

U.S. patent application Ser. No. 09/693,358 entitled, "Scaleable Interconnect Structure Utilizing Quality-Of-Service Handling", naming Coke Reed and John Hesse as inventors;

U.S. patent application Ser. No. 09/692,073 entitled, "Scaleable Method and Apparatus for Increasing Throughput in Multiple Level Minimum Logic Networks Using a Plurality of Control Lines", naming Coke Reed and John Hesse as inventors;

U.S. patent application Ser. No. 09/919,462, entitled, "Means and Apparatus for a Scaleable Congestion Free Switching System with Intelligent Control", naming John Hesse and Coke Reed as inventors;

U.S. patent application Ser. No. 10/123,328 entitled, "A Controlled Shared Memory Smart Switch System", naming Coke S. Reed and David Murphy as inventors; and U.S. patent application Ser. No. 10/289,902 entitled, "Means and Apparatus for a Scaleable Congestion Free Switching System with Intelligent Control II", naming and Coke Reed and David Murphy as inventors.

FIELD OF THE INVENTION

The present invention relates to a method and means of controlling an interconnect structure applicable to voice and video communication systems and to data/Internet connections. More particularly, the present invention extends the concepts introduced in the related patent No. 8 entitled "Means and Apparatus for a Scaleable Congestion Free Switching System with Intelligent Control".

This invention shows how to use the incorporated inventions to handle a wide variety of traffic conditions and non-connection protocols, including Internet Protocol and Ethernet. Moreover, new protocols and systems will come on line because of advances in technology and architectures. In particular, the present invention and the incorporated inventions very much broaden the horizon of possibilities. Therefore, in addition to describing systems to handle the existing packet formats, this patent describes systems that will handle future packet formats as well. Several packet formats may enter the switching system at the same time. The system may treat the various types of packets in different ways. In addition to teaching new ways to control and switch the packets, the present invention teaches how to handle packets at the input and output interfaces of the system.

SUMMARY OF THE INVENTION

There can be no doubt that the volume of communication traffic will increase dramatically over the next twenty years. The next generation of switching systems must be scalable and intelligent. The next generation of switches must be reliable and able to carry more data at lower cost. The incorporated inventions clearly point the way to the future of switching. The switches of the future must be able to handle data that is sent in the present formats as well as handle packets that are sent in new formats that are made practical by the switching breakthrough described in this and the incorporated to patents. The present invention describes an intelligent packet switching system that can simultaneously handle packets of various types. The systems explained in the invention are designed to have a large number of input and output ports with high bandwidth per port, to have low latency, to be reliable, and to offer cost effective solutions. The existing transparent switches are backbone circuit (connection) switches. What is needed is an intelligent transparent packet switch. This patent describes the first such device. The devices described in patents No. 8, No. 10 and this patent can be used in an extremely wide variety of applications. They can replace the existing backbone switches, thus offering far more flexibility to the entire system. They can serve as the next generation of very high bandwidth routers. In general, they can serve as the building blocks of the entire next generation of data-moving platforms.

A single switching system of the present invention can simultaneously receive a variety of packet formats, including:
- electronic packet transmissions;
- optical wave division multiplexed data (WDM) with a single frame consisting of a plurality of packets to be sent to a common output line, with each packet traveling on a separate wavelength;
- WDM packets where the header of an individual packet travels on a wavelength different from the remainder of the packet (i.e. the payload) and the payload either travels on a single wavelength or is subdivided into a plurality of sub-packets with each sub-packet carried on a separate wavelength; and
- a single-wavelength system, which is a subset of format (3).

The techniques employed here are very general, and it will be clear to one reasonably skilled in the art that these techniques can be applied to other forms of electronic and optical data. Each of the above packet formats can arrive at a system of the type described in patents No. 8 and No. 10. In the patent No. 8 and No. 10 descriptions, the optical packet is converted to electronics before insertion into the switch. In one embodiment of the present invention, the arriving electronic packets are switched electronically. In a first embodiment, the packets of format (2) are all converted to electronics and switched electronically, then switched back to optics (OEO). In a second embodiment, the packets of format (2) are switched optically in case the packets are all targeted for the same output port, but are switched electronically in case some of the packets in the frame are targeted for different output ports. In an embodiment described here, the packets of formats (3) and (4) are switched optically. In one embodiment, each output line of the switch is designed to carry only one of the three types of packets. Nevertheless, for each type, there is at least one output line from the system that is capable of forwarding that type of packet downstream. An important illustrative embodiment concerns the optical switching of packets of format (3).

The main steps of intelligent transparent packet switching are:

The headers of the arriving packets are detected, processed, and sent to one or more logic units.

The electronic logic unit (or units) controls a de-concentrating component of the system. The de-concentrating unit receives packets on N input lines and outputs packets on K output lines so that the minimum dark space interval between two consecutive packets on a de-concentrating unit output line will be greater than the minimum dark space between two consecutive packets on the input lines. Typically, the number K of lines out of this de-concentrating component is of the form $2^J \cdot N$, where J is an integer.

The packets are realigned in the K transmission lines. This realignment shifts packets back on the data lines a variable distance, but the sequential order of the packets on each line is left unchanged.

The headers of the realigned packets are then read and sent to one or more logic units.

A logic unit compares the headers of packets that are targeted for the same output line. Two or more packets to be compared may arrive from different input ports, and this comparison may take quality of service (QoS) into account in conjunction with current traffic at the output port. The comparison of information associated with packets destined for the same output port and action based on that comparison form an important feature of the present invention and of the invention described in patent No. 8. This feature provides a high level of intelligent control for systems described in patents No. 8, No. 10, and in the present patent. The control systems utilized in this patent and in patents No. 8 and No. 10 define a new, higher level of performance not found in other systems.

After making their comparisons, the logic units determine how long to delay each packet in order to prevent a collision. Accordingly, the units cause the packets to be re-sequenced in the K data lines.

The nodes of one or more optical packet switches are set by a logic unit, or the packets may pass through a self-routing packet switch, such as an MLML switch taught in patent No. 1.

Packets are sent through a switch that may be constructed using a wide range of technologies, including optics and electronics.

After a second variable-delay adjustment, packets in lines leaving the optical packet switch are concentrated into fewer data lines. Typically, there are N data lines entering the packet switching and control system; there are $2^J \cdot N$ or more lines internal to the system; and there are N lines leaving the switching and control system.

The packets may be amplified and cleaned up prior to sending them down output lines. The format of packets leaving the switch may or may not be the same as the format of packets entering the switch. Additionally, there may be amplification and cleaning of the packets inside the packet switch. An in depth description of each of these steps is given later in the "Detailed Description" section of the patent.

In the embodiments of the invention described herein, there are N incoming lines entering the switch. Each input line goes through J de-concentration switches, so that the heavy traffic entering an input line into a de-concentration unit (similar to a time-division demultiplexer) exits through one of $K=2^J$ lightly loaded lines. The purpose of this process is to insure a sufficiently large "dark gap" between any pair of successive packets exiting the same path of the de-concentration unit. This large gap advantageously permits the use of slower, less costly switches in the remainder of the packet's journey through the system. There are a total of $N \cdot 2^J$ lines leaving the N de-concentrators. For ease of illustration, the drawings assume that J=2, so that $K=2^J=4$. These lines may be denoted by the sequence $\{L_{kn},\}$ where $1 \leq k \leq K = 2^J$ and $0 \leq n \leq N-1$. Thus, the lines exiting the de-concentrator unit $DC_n$ would be denoted by $L_{1n}, L_{2n}, \ldots, L_{Kn}$. The number $MD_1$ is defined as the time period (or "distance") between the beginnings of the timing bits of two adjacent packets in the incoming lines. The number $MD_2$ is defined as $MD_1 \cdot 2^J$, which is the minimal time period between the beginnings of the timing bits of two adjacent packets in one of the lines leaving the de-concentrator. The term "timing bit" refers to the leading edge of the envelope of the optical packet, assuming there is a detectable dark gap between incoming packets. An optical or electronic line contains a system-wide reference signal of short pulses with a period of $MD_2$.

The timing bit is read from incoming packets at input point PD. The packet is then put through a delay loop while the timing bit is sent to logic units that read the timing bit and send control signals to the switches in the deconcentrator and in the realignment modules. The logic functions in such a way that the 1×2 switches in the de-concentrator unit are set in a timely and orderly fashion prior to packet arrival, that is, switches are set/reset during the large dark gap between successive packets. This method has an additional advantage of causing the lines leaving the de-concentrator to be equally heavily loaded.

The 1×2 switches in the de-concentrator and in the re-sequencer can be constructed using lithium niobate gates, silicon optical amplifiers (SOA), or other type of optical gates of sufficient speed. In case the switches cause losses in the signal, there will be a need for amplification along the lines. These amplifiers are appropriately placed in order to amplify signals after they pass through a given number of gates. (These amplifiers are not always illustrated in the drawings.) There may also be a need for units that clean up the signal as it passes through the system, advantageously maintaining an adequate signal to-noise ratio. The switch at the root of the de-concentrator needs to be faster than the switches further down the tree. The switches at the second level of the de-concentration tree can operate at a lower rate, and the switches at the next level can be still slower, and so forth. It is advantageous to have only one very fast switch per input connection because fast switches tend to be more expensive and use more power.

Packets entering the switch from upstream are generally out of synch with respect to each other and other input lines. It is the purpose of the realignment unit to build global synchronization. A system-wide timing signal is used for this global realignment. Control lines, signaling lines, data lines, and other non-packet transmission lines and devices may be optical, electronic, or may employ a combination of the two technologies. In some embodiments of the present invention, there may be multiple synchronous copies of this reference signal. The global alignment unit consists of a group of switches and delay loops. Packets first pass through a 1×2 root switch that sends packets "up" or "down," that is, on alternate branches of the unit. Packets traveling up pass through a delay loop of length $MD_2/2$. Following this loop, the packets enter an optical variable-delay unit, VDL, consisting of a tree of switches and loops that can delay a packet a minimum of 0 time units to a maximum of $MD_2$ time units. Packets passing through the bottom of the root switch enter an identical variable-delay unit VDL. Therefore, the packet alignment system is capable of delaying the packets a minimum of zero to a maximum approaching $3MD_2/2$.

The packets leave the alignment unit in such a way that a packet on the top line of the $2^J$ lightly loaded lines has its center positioned midway between a system-wide, periodic timing pulse and a point traveling at distance $MD_1$, behind the pulse. Packets traveling on the line one down from the top line have their centers halfway between a point traveling $MD_1$ behind the pulse and a point traveling $2 \cdot MD_1$ behind the pulse. This continues until the packets traveling on the bottom line of the $2^J$ lines has its center halfway between a referenced pulse and a point traveling at a distance MD, ahead of that pulse.

The decision whether or not to send a packet up or down through the first loop is made so that the packets entering either system VDL need to be delayed an amount between $MD_2/4$ to $3 \cdot MD_2/4$. The purpose of this first loop is to avoid the problem of one packet being delayed an amount close to $MD_2$ and a following packet being delayed an amount close to zero, thus causing a collision.

The set of all packets that leave the system alignment units in the time interval between two successive pulses of the reference signal can be formed into groups. Let $G_1$, denote the collection of all packets in this interval that exit from the top line $L_{1n}$ of some system alignment unit $PA_n$. Let $G_2$ denote the collection of all packets in the interval that exit from the set lines $L_{2n}$, which are located one below the top line of the alignment units. Continue in this manner so that $G_k$ denotes the collection of all packets in the interval that exit from the set of bottom lines $L_{Kn}$ of the alignment units. Note that for each k in the sequence, $G_k$ contains N or fewer packets, and that all the packets in $G_k$ are aligned with respect to each other. Furthermore, if $1 \leq k < K$, then all the packets in $G_k$ precede the packets in $G_{k+1}$ by an amount determined by the length of a packet plus the length of the gap between consecutive packets.

After alignment, the packet enters a packet header reader, HR, which has an optical tap that connects to an optical-to-electronic converter (O/E). The packet then enters a large optical delay loop that delays it a sufficient amount of time for the control system to determine what to do with it. The delay loop may contain a plural number of packets and serves as a FIFO (first-in, first-out buffer). There is an input port controller (IPC) in the system control unit for each input port; the IPC reads the packet header to determine its priority and output port. The packet switch is a crossbar-type switch with N inputs, N outputs, and $N^2$ nodes. A requirement for the operation of a crossbar is that no more than one input can be connected to a given output at the same time. It is the function of the control system to honor this constraint while taking into account any QoS requirements and any contention among a plurality of input ports that want to send to the same output in the same time interval. The control system achieves these objectives in a scalable manner by means of what can be thought of as an "analog" of the packet switch in conjunction with a set of output-port traffic managers. During the time the packets are in the optical FIFO, each IPC sends a surrogate of the actual packet (a "request") to the appropriate virtual output port, termed a "request processor". Each request processor (RP) controls and schedules all traffic for its associated output port. For each cycle, an RP may receive zero, one, or multiple requests; it examines the timing and priority fields of each request and decides when each of the competing IPCs will get to use the crossbar for its respective packets. Typically, each IPC will have future time slots that are booked for packets that entered the FIFO earlier and other time slots that are currently available. The request packet from the IPC informs the RP which slots are available for its use. The RP keeps track of current and future time slots that are still available, that is, upcoming time slots that are open for the associated output port. The RP processes the set of requests from one or more IPCs along with its set of available time slots; it then sends to each requesting IPC an "answer" indicating when the packet must enter the switch. In this process, input port controllers (IPC) do not communicate directly with each other; similarly, request processors (RP) do not communicate directly with each other. An IPC communicates solely with an RP to which it wants to send a packet; an RP communicates solely with requesting IPCs, but only in response to a request to send to the port under its control. Communication from IPCs to RPs is by means of a scalable request switch (RS) of the type disclosed in patents No. 1 through No. 7. Response packets are communicated by a similar answer switch (AS). Control systems are disclosed in the inventions taught in patents No. 8 and No. 10.

The above steps are performed and completed while the subject packet is in the optical FIFO. The RP informs the IPC of the time slot in which to send the packet into the crossbar (packet switch). Accordingly, as the IPC knows when each packet will exit the FIFO, it easily computes how much longer the packet is delayed after exiting the FIFO so that it enters the crossbar exactly on schedule. Upon exiting the FIFO, the packet enters an optical variable-delay unit (consisting of an optical demux) that feeds into a set of delay loops whose lengths are integer multiples of the packet cycle time. The packet is switched through the appropriate delay loop and enters the crossbar at the time specified by the RP, which desirably prevents collisions. In some cases, an output port may be overloaded, and thus, one or more packets must be discarded; in this case, the packet is discarded before entering the crossbar. When QoS is implemented, the request processor uses priority in determining what to throw away.

Packets exit the crossbar at the output port determined from its header. If a de-concentration step was performed at the front end, packets destined for the same output port enter a concentrator (MUX) that combines them into a single downstream line. In some embodiments, a packet re-alignment unit makes relatively small adjustments to the packets prior to entering the MUX; thus, the minimum inter-packet dark gap is maintained downstream.

BRIEF DESCRIPTION OF THE DRAWINGS

In the figures, optical signal paths are generally indicated by "λ" and are drawn with smooth curves when the direction changes; electronic-only paths are drawn with sharp angles.

DETAILED DESCRIPTION OF THE INVENTION

Figure 1A:
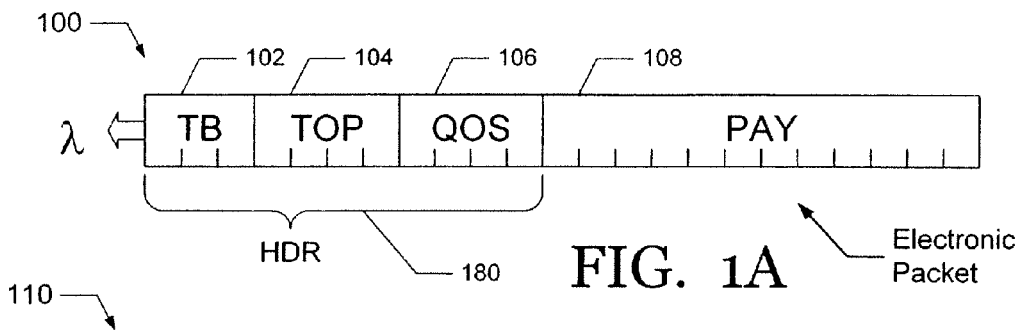
FIG. 1A is an illustration of an electronic data packet 100.
Figure 1B:
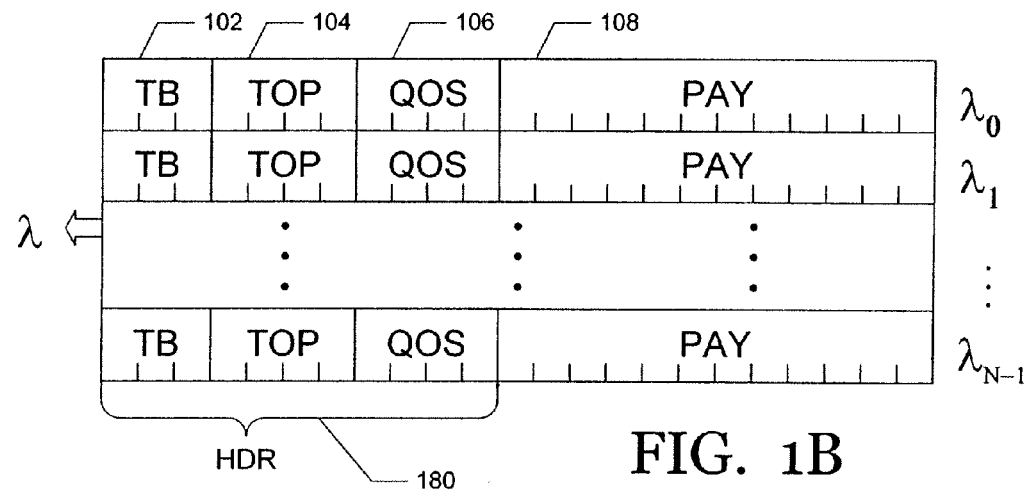
FIG. 1B is an illustration of number of optical data packets 110 in a frame, with each packet having its own wavelength.
Figure 1C:
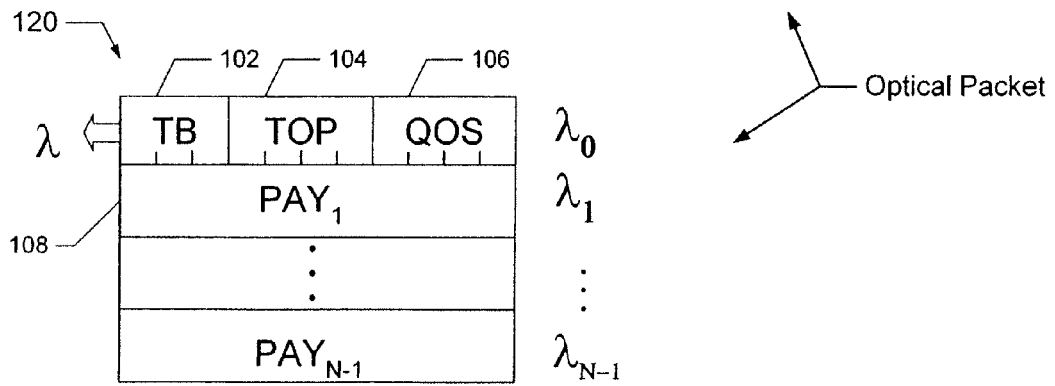
FIG. 1C is an illustration of an optical data packet 120, which uses one or more wavelengths for the header (102, 104, 106) and one or more different wavelengths for the payload 108. (This format is used in the main embodiment of the present patent.)
Figure 1D:
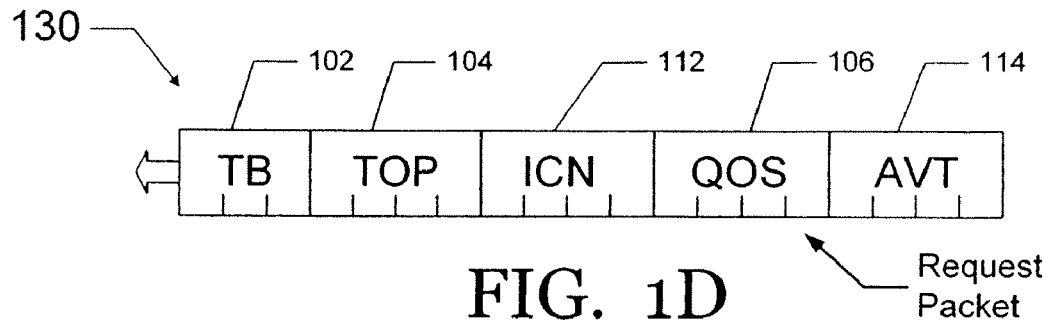
FIG. 1D illustrates a request packet 130 sent by an input port controller in the system logic control unit to the request processor unit in the system logic control unit.
Figure 1E:
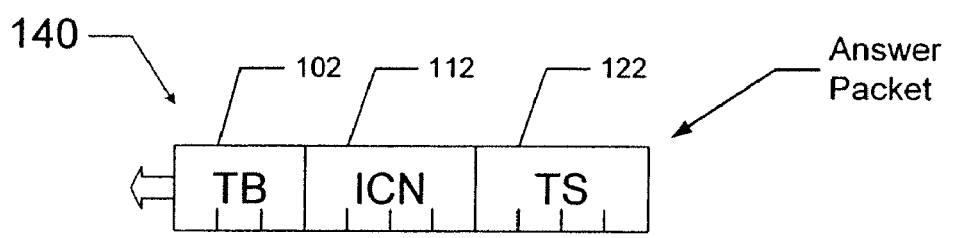
FIG. 1E illustrates an answer packet 140 sent back to an input port controller by a request processor.
Figure 1F:
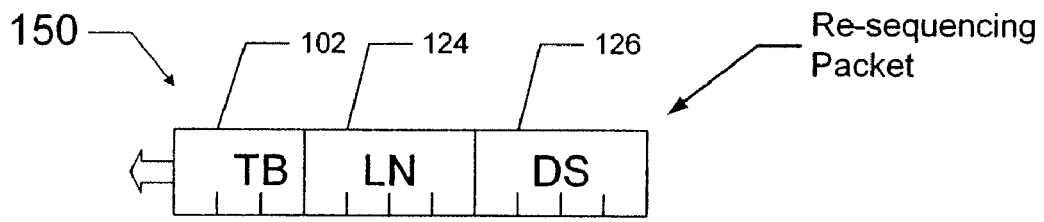
FIG. 1F illustrates a re-sequence packet 150 sent by an input port controller to re-sequence an individual packet.
Figure 1G:
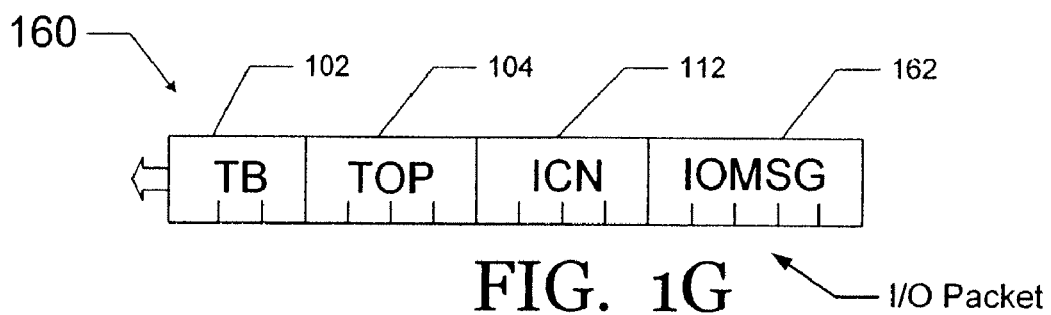
FIG. 1G illustrates I/O packet 160 that is used for a variety of internal signaling functions among input processors, request processors, and the external control and interface unit (ECIU) 254.

FIGS. 1A, 1B, and 1C illustrate the formats of optical packets that arrive from upstream. The switching system forwards packets downstream according to fields in the header. FIGS. 1D, 1E, 1F, and 1G illustrate electronic packets used internally in the system for inter-unit communication and control. The following table gives a description of the various fields in these packets.

TABLE 1

AVT Field indicating the set of all time slots available to the input port controller for injecting a given packet into a packet switch. AVT field 114 of request packet 130 is sent by an input port controller 704 in system logic control unit 260 or 280 to the request processor 710 that governs all traffic flow through its associated output port via line 218; it is used to determine what re-sequencing of the packet, if any, is necessary.

DS A sequence of switching settings 126 used by the re-sequencing unit to change the order (and thus the time) in which a packet 1o enters a packet switch.

ICN The identifying number (input port address) 112 for an input port controller in the system logic control unit. Used by a request processor to return answer packet 140 to the input port controller that sent the request.

IOMSG The payload of message 160, which can be sent from one IPC, or request processor, or external control unit to another. The content of payload 162 is dependent on the particular message being sent and is described in detail here. It typically contains subfields, TABLE 1-continued including packet length, packet ID, and other fields pertaining to the type of message.
LN The relative line number 124 for a packet after the de-concentration process.
PAY The payload 108 of the packet, which may be divided into a plurality of
sub-packets and may be carried using a plurality of wavelengths.
QoS Quality of service field 106 used by a request processor in making its decisions
related to the value of the packet and type of service it receives.
TB Leading timing bit 102, or leading edge of the optical power envelope, that
indicates the presence of a packet and/or its precise time of arrival.
TOP Target output port number (address) 104 for a packet.
TS Time slot 116 selected by the request processor for injecting a given packet into a
packet switch. This field may also be used to indicate that a packet is to be discarded.

Figure 2A:
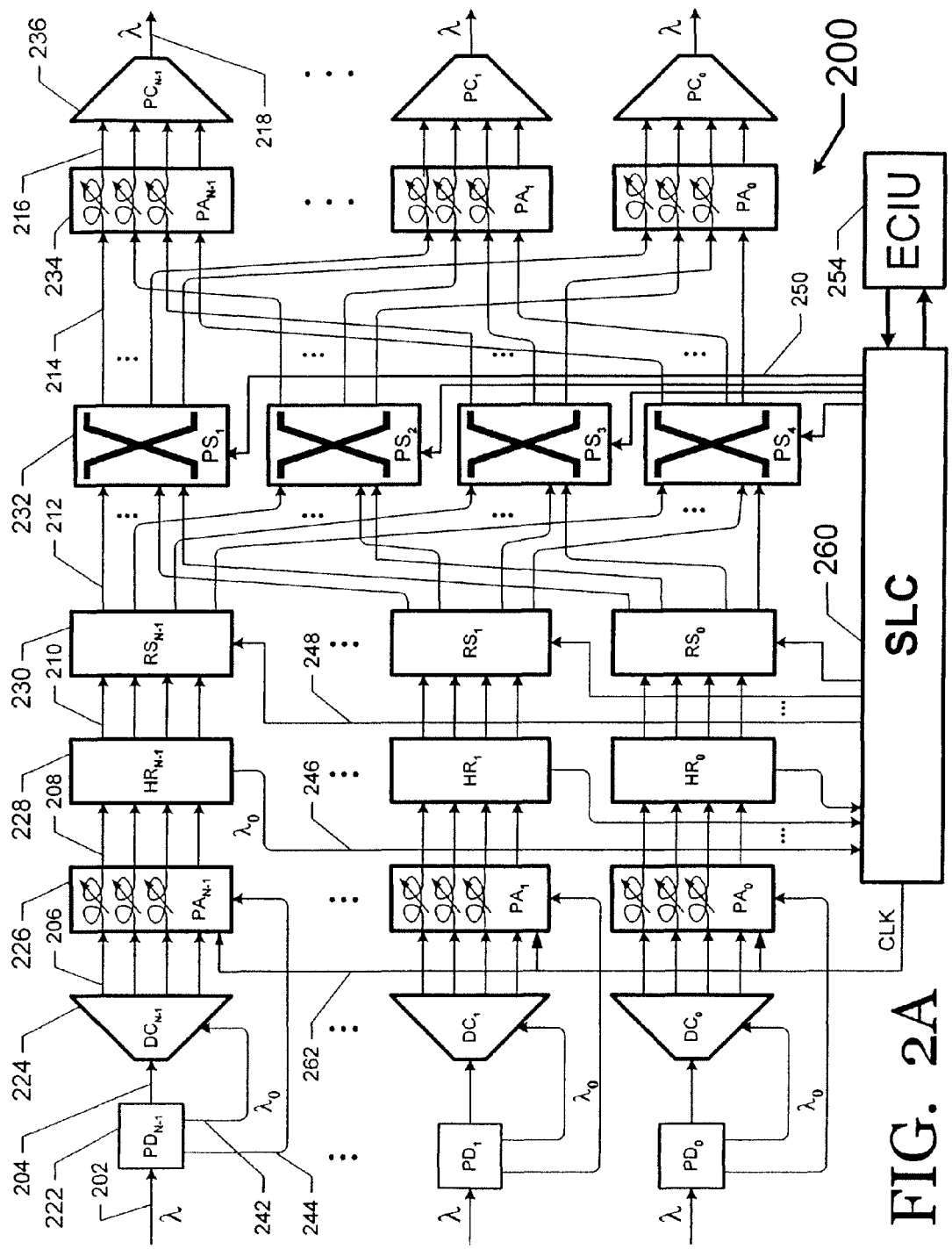
FIG. 2A is a block diagram of a packet switch that is suitable for intelligently switching packets in the form of FIG. 1C.

A block diagram of an intelligent switching system is illustrated in FIG. 2A. Components of the system 200 are shown selectively coupled by a plurality of interconnect lines. Packets enter the system through lines 202. Packets of the forms illustrated in FIGS. 1A, 1B, and 1C are well suited for switching by this system in applications where optical dispersion in not a significant factor. In the first embodiment described herein, it is assumed that the packet is of the form of FIG. 1C. The system includes a plurality of module types, including:
  packet detectors (PD) 222;
  packet de-concentrators (DC) 224;
  packet alignment units (PA) 226 and 234 (284 in FIG. 2C);
  header readers (HR) 228;
  packet re-sequencing units (RS) 230;
  packet switches (PS) 232;
  packet concentrators (PC) 236;
  system logic control unit (SLC) 260 (280 in FIG. 2C) that globally manages and controls the flow of all traffic through the system; and
  an external control and interface unit, (ECIU) 254 that communicates with all internal processing devices in the system, coordinates and updates many details of their functions, and supports external operation, administration and control of the entire system.

A packet enters the system on line 202. It passes through packet detector 222, which detects if (and precisely when) the leading edge of a packet has entered the system. This timing signal is sent to de-concentration unit 224 via line 242 and, in one embodiment, also to packet alignment unit 226 via line 244. The packet continues through the switching system on its journey to output line 218 on the following path:
  via interconnect line 204 to packet de-concentration unit 224 (which is similar in function to a time-division demultiplexer);
  through interconnect line 206 to packet alignment unit 226, which provides internal system-wide synchronization to facilitate subsequent processing,
  via line 208 to header reader and delay unit 228;
  through interconnect line 210 to packet re-sequencing unit 230;
  via line 212 to packet switch 232;
  through line 214 to a second alignment unit 234, which makes small timing adjustments so that the packet is aligned suitably for the next concentration step;
  through line 216 to packet concentrator 236 (similar to a time-division multiplexer), and finally;
  the packet exits the system via line 218 and is sent downstream on its journey to its eventual destination.

The packet de-concentration units 224 and the packet alignment units 226 and 234 do not use the data content of the packet; instead, they use the timing of the "envelope" of the arriving packet. A header reader unit 228 employs an optical tap to send a copy of the packet header 180 to the system logic control unit, where it is converted to electronic form. Control system 260 employs means and apparatus to read and process header information for subsequent management of all packets and their flow through the switching system components. Fixed-delay loop 602 in the header reader acts as an optical packet buffer (an optical FIFO) that delays a packet for a sufficient amount of time for control system 260/280 to complete all operations that determine the subsequent path of the packet. Packet re-sequencing units 230 and packet switches 232 are controlled by the system logic control unit (SLC) 260/280. The system control unit sends control information (which is based on current traffic rates, packet priority, and target output port status) to re-sequencing units 230 and to switches 232. Understanding of the operation of the intelligent switching system is achieved by understanding each of its component units and their collective functions. The component units will be described in the order in which they receive packets and control signals.

Figure 2B:
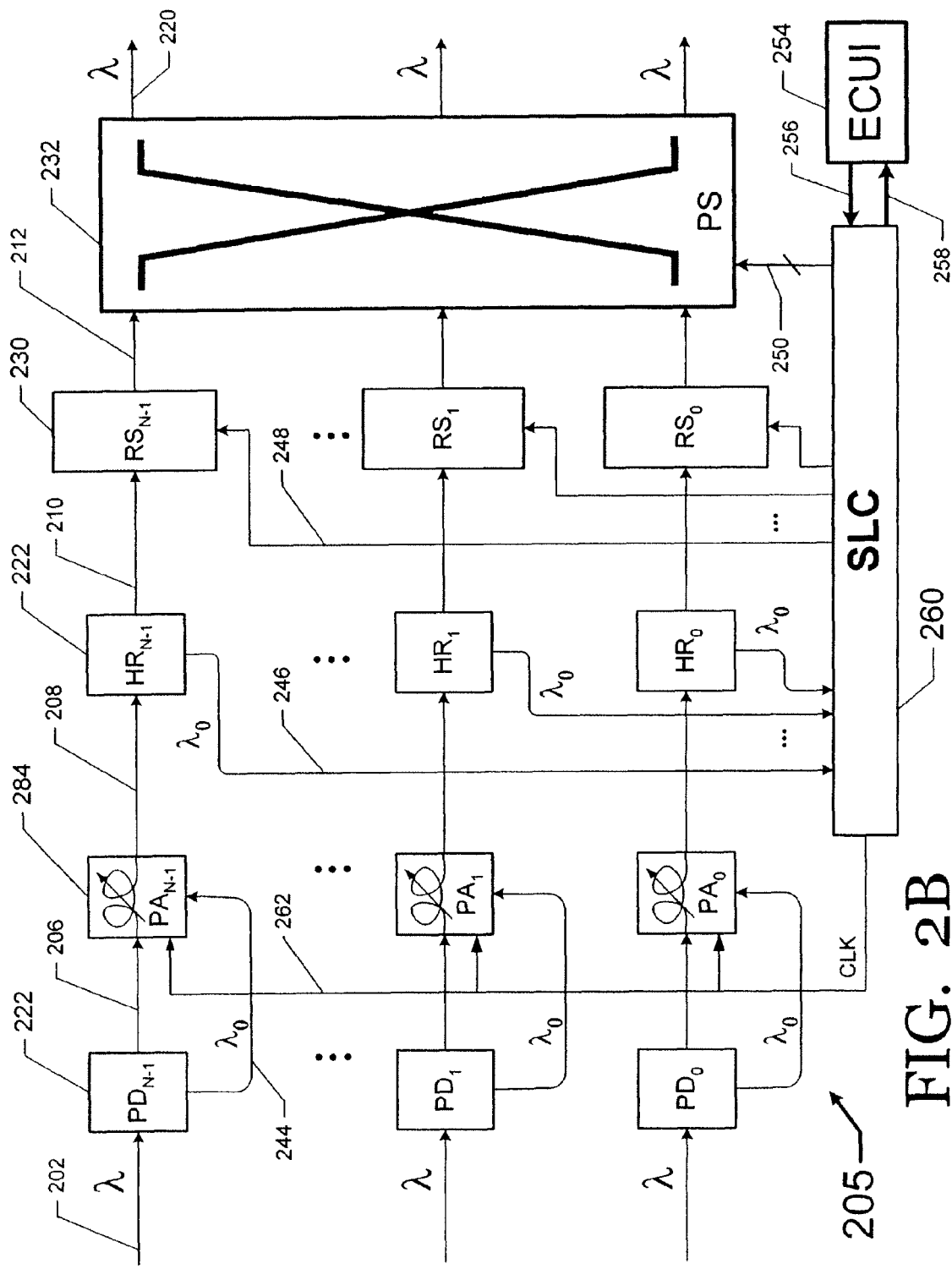
FIG. 2B illustrates an embodiment of the packet switching system in which a de-concentrator unit is not employed.
Figure 2C:
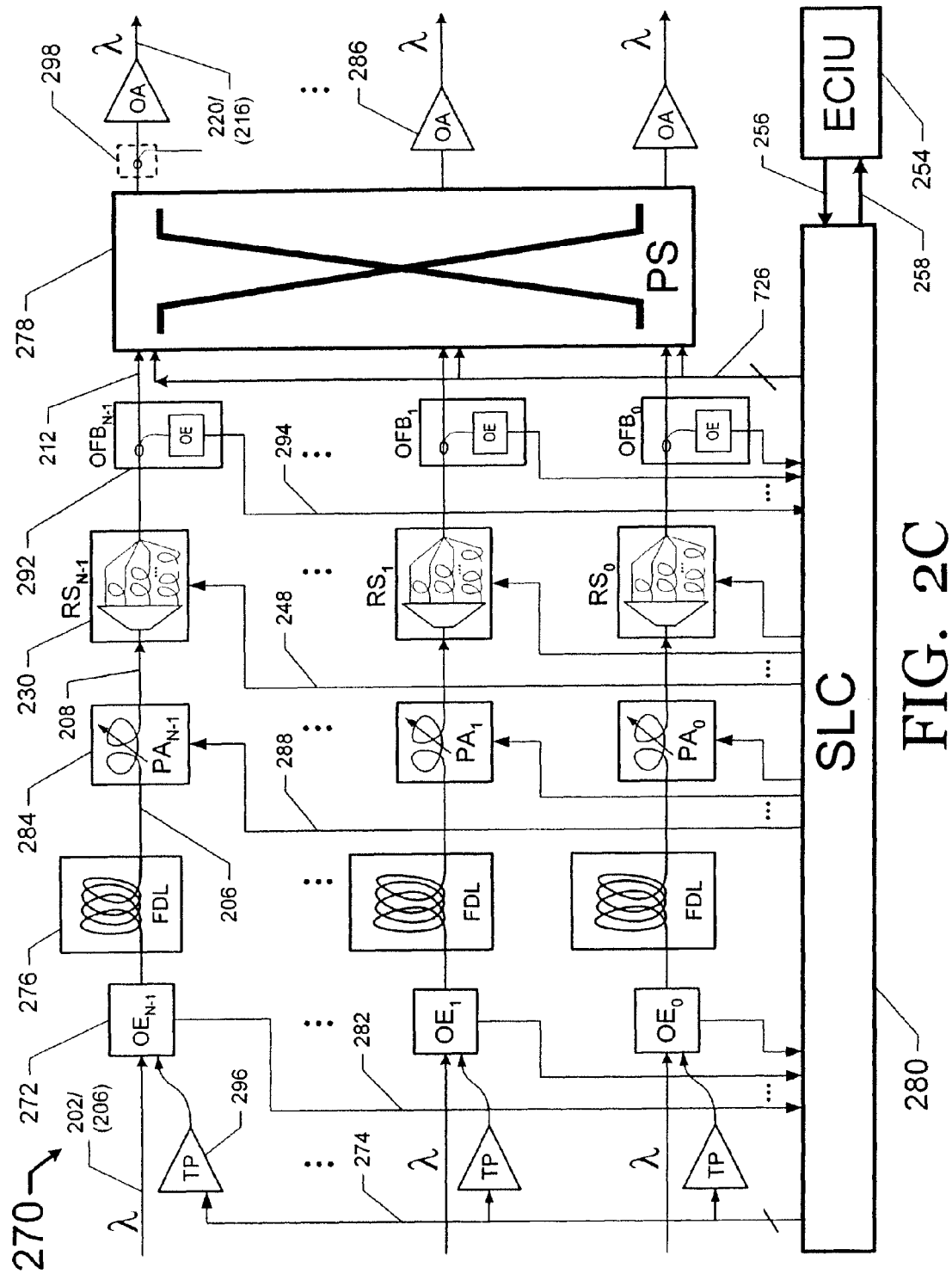
FIG. 2C is an embodiment that employs optical lines and components only for packet transmission; electronic lines and components are employed elsewhere whenever possible. Optical feedback "taps" provide precise timing information related to the flow of optical packets through the system.

Alternate embodiments of the system are illustrated in FIGS. 2B and 2C discussed in the section entitled "Alternate Embodiments".

Figure 3:
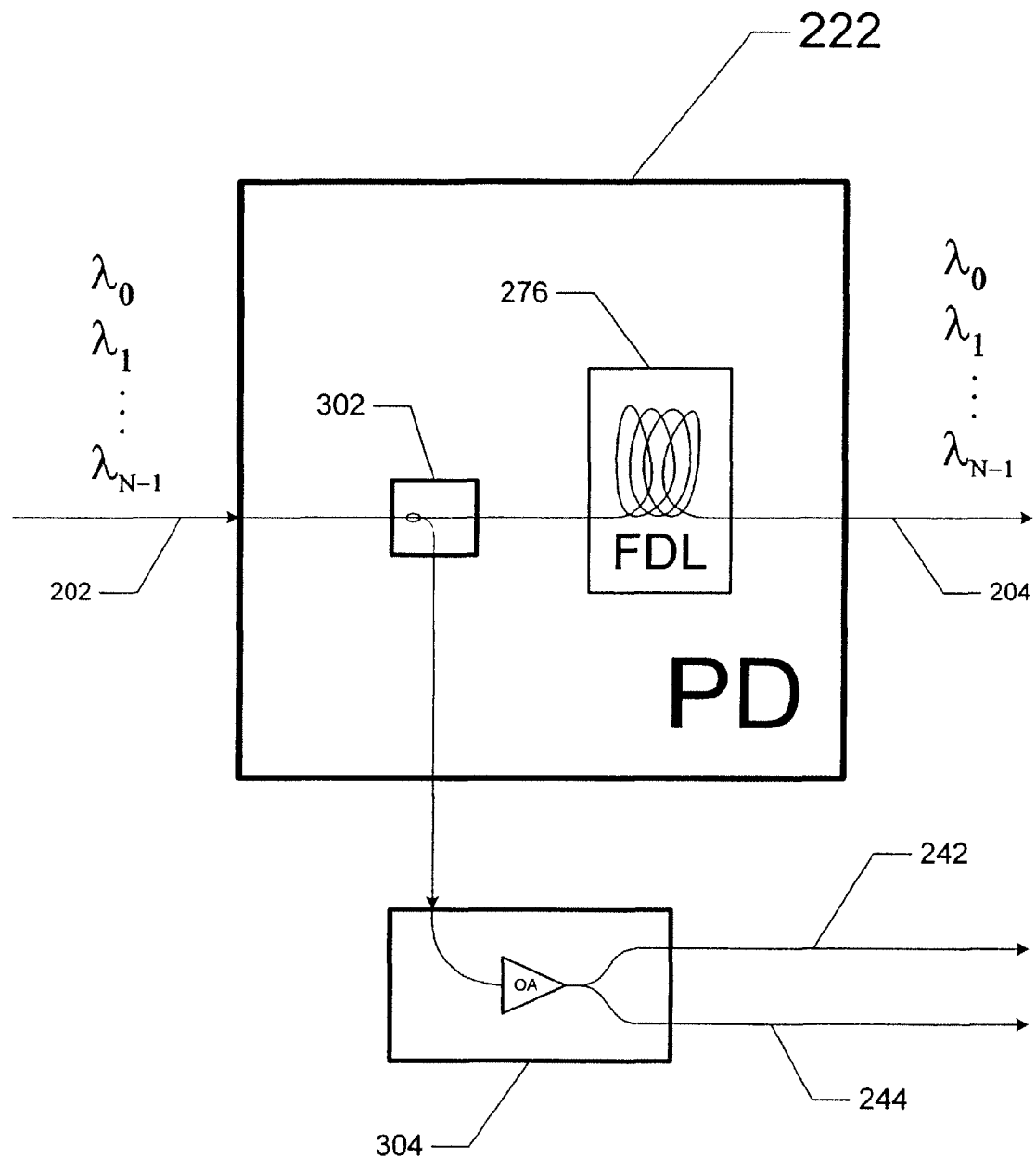
FIG. 3 is a diagram of an optical packet detector with an amplification unit and an optical fixed delay loop (FDL) that serves as an optical FIFO.

FIG. 3 is a block diagram of packet detector 222, optical amplifier 304, and fixed-delay loop (FDL) 276. The packet detector receives input on line 202 in the form of serially arriving optical packets, which exit the detector on lines 204. The leading edge (or timing bit) of the packet is picked off by an optical tap 302 and copies of it are sent to the de-concentration unit and to the packet alignment unit on lines 242 and lines 244, respectively. It is possible for the packet detector to send the header (or timing information) to the de concentrator unit, to the packet alignment unit, or to both units in either electronic or optical form. In another embodiment, line 244 is omitted and the packet alignment unit has its own packet detector. In the present embodiment, the packet detector sends the header information in optical form. In one embodiment tap 302 drops only a small portion of the signal into lines 242 and (possibly) 244; it may be necessary to amplify the signals on these lines. In one embodiment, this could be accomplished by employing an erbium doped fiber amplifier or similar optical amplifier 304 in lines 242 and 244; these lines could be pumped by a single laser (not shown).

It is convenient for the header to be of a specific wavelength $\lambda_o$ so that device 302 can passively strip off a portion of the light of wavelength $\lambda_o$ from the packet. In an alternate embodiment, it may be convenient for each bit of the header to be a different wavelength (but requires that more wavelengths be broadcast). In the case where the header has multiple wavelengths, $\lambda_o$ is the wavelength of the timing bit.

The time of arrival of the packet is the only control information that is used by the de-concentration unit. In order to delay the packets for the proper amount of time, and thus synchronizing their arrival with the control information, the packet detector contains a delay loop 276. Accordingly, the packet detector sends a signal, which indicates the precise arrival time of the packet at the de-concentration unit. This signal is the timing bit in the header of packet M; it is this bit that governs the timing of the control bit in line 242. In other embodiments, there is a plurality of lines 242 from the packet detector to the de-concentrating unit. Each of these lines carries a timing signal to various switches that are internal to the de-concentration unit. It is important that the signal on line 242 arrive precisely at the right time. In an alternative embodiment, the header (which includes the timing signal) is sent directly from the packet detector to the de-concentrator. Depending on the technology, it may be necessary that the de-concentrator have an optical to electronic conversion unit.

Figure 4A:
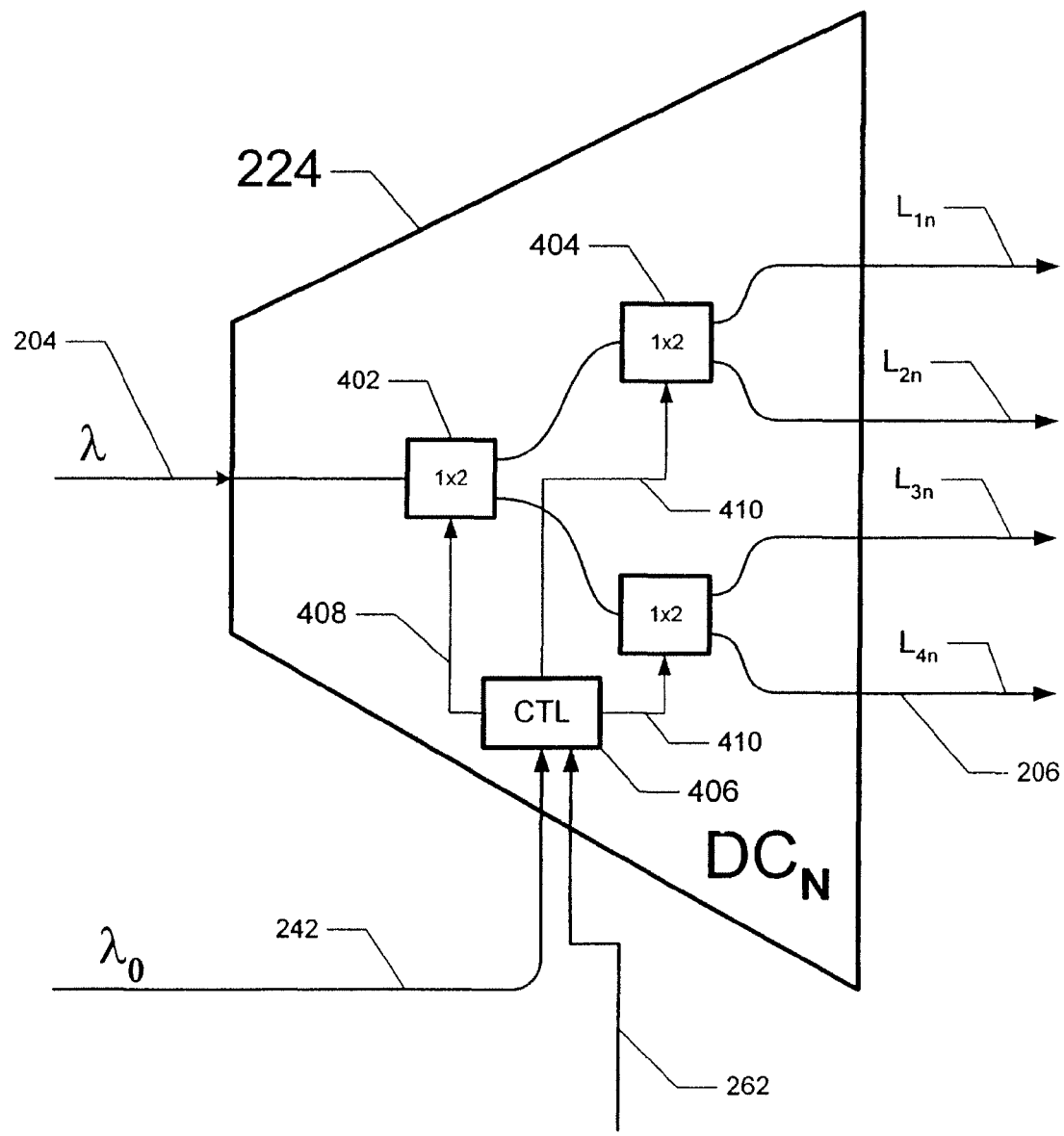
FIG. 4A is a diagram of a de-concentrator unit which increases the amount of "dark time" between exiting packets.
Figure 4B:
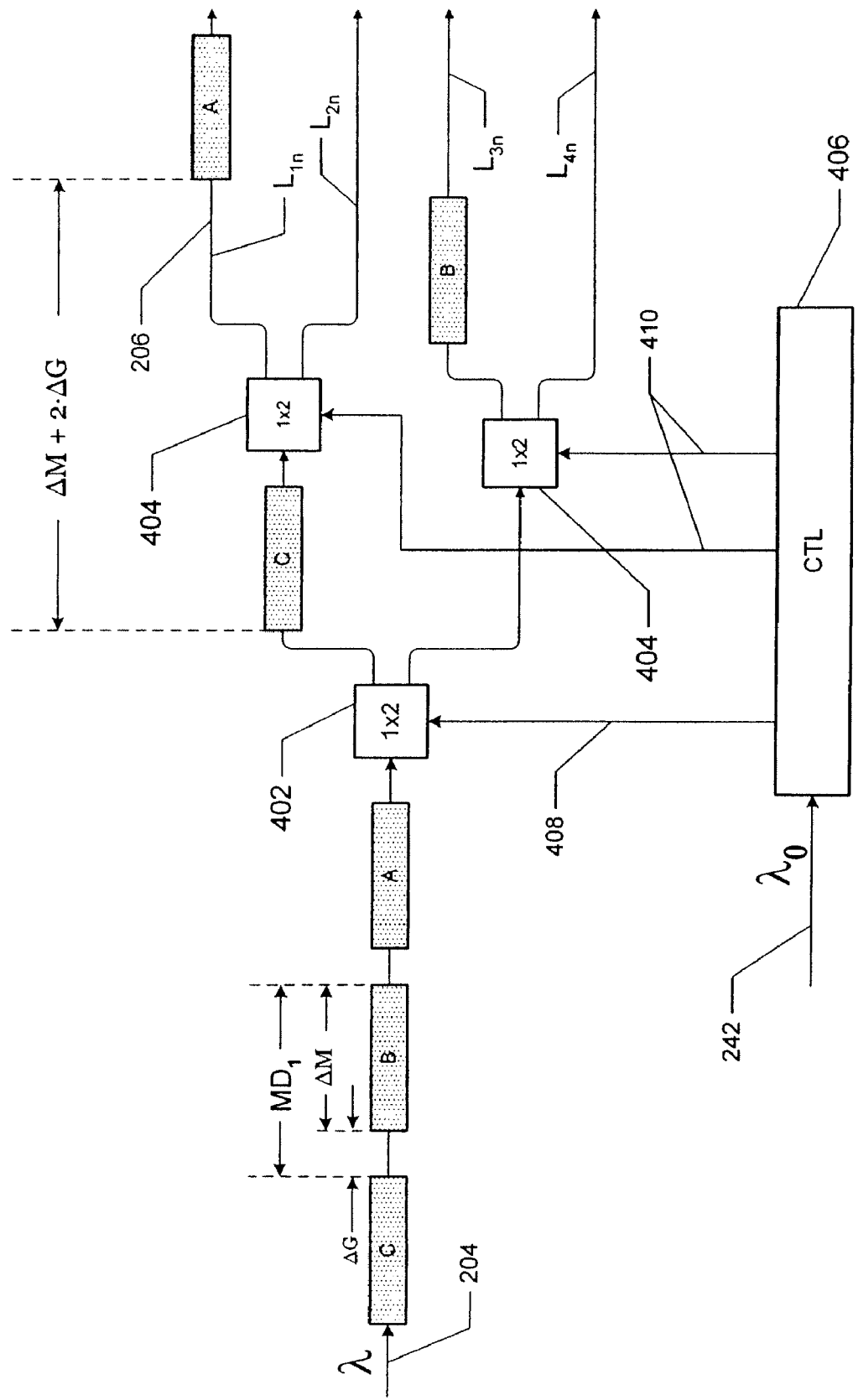
FIG. 4B is a diagram that shows packets being de-concentrated from one line to four, advantageously permitting the use of lower cost optical switching components.

Refer to FIG. 4A for a schematic diagram of a packet de-concentration unit (DC) 224. This unit receives packets on input line 204 and outputs them on a plurality of lines 206. The unit receives timing information on line 242. As illustrated in FIG. 4B, there is a time $\Delta M$ that indicates the length of time that it takes a packet M to pass a point on the fiber. The packet width $\Delta M$ is constant for all packets. There is minimum gap time $\Delta G$, which is the time that it takes for the shortest gap between packets to pass a point on the fiber. The intelligent switch system 200 sends packets downstream on output lines 218 in a manner preserving the minimum "dark gap" between successive packets. When an upstream connection is sending at less than 100% traffic rate, the dark gap between successive packets is $\Delta G$ plus an integer multiple of ($\Delta G+\Delta M$). It is assumed that the intelligent switch 200 receives packets from other switches that use this format. In case the intelligent switch receives packets in another format, it may be necessary that there exist a packet format conversion unit that precedes the intelligent switch, 200.

The de-concentration unit of FIG. 4A contains a plurality of 1×2 switches arranged in a tree structure. Lithium niobate gates and silicon optical amplifiers (SOA) are suitable for use in this application. Other technologies may be used for these gates as well. There is a single, high-speed 1×2 switch 402 at the root of the tree and a pair of slower speed 1×2 switches 404 at the second level of the tree. The tree illustrated in FIG. 4A is a binary tree with two levels. For various applications, the tree can have a number of levels different from two, and the tree can have a branching basis distinct from two. In the model embodiment of FIG. 2A, the binary tree of two levels enables the de-concentrator to receive packets on one line and output packets on four lines. This set of lines exiting a de-concentrator unit $DC_n$ (or other unit type), where $0 \leq n \leq N_{-1}$, will be referred to as an "internal line set", which is labeled $L_{1n}$, $L_{2n}$, $L_{3n}$ and $L_{4n}$ in the drawings for the model embodiment. The individual nodes in the tree structure are switched by a de-concentrator control unit 406. The control unit receives timing input on line 242 and sends control signals to node switch 402 through line 408 and to node switches 404 through lines 410.

Referring to FIGS. 3 and 4A, packet detector 222 sends a signal down line 242 indicating the time of entry of a packet M into the detector. While packet M passes through delay loop 276, the control signal in line 242 arrives at the de-concentrator control unit 406 so that the control signal sent via line 408 arrives at the proper time for switch 402 to change state after packet M has passed through switch 402, but before another packet arrives at switch 402. Alternately stated, switch 402 changes states during the time interval $\Delta G$ (refer to FIG. 4B). Similarly, the control signals on lines 410 arrive at switches 404 so that these switches change states between entering packets. Node 402 is a high-speed, 1×2 optical switch that is capable of toggling in the brief time period $\Delta G$, which is the minimum separation between incoming packets.

Notice that the gap between packets entering switch 404 is at least of length $\Delta M+2 \cdot \Delta G$. The cost of switch 404 as well as the power that it uses is a function of its switching speed. Therefore, the switch 404 is less expensive than switch 402. The minimum length of the blank space $\Delta B$ between packets on a line 206 is advantageously increased to at least $4 \cdot \Delta G + 3 \cdot \Delta M$. Any switch that directs packets on lines 206 can be slower yet.

The purpose of the de-concentrator unit is to create $\Delta B$, a large, regular gap between packets. Accordingly, slower and lower-cost switches are employed in the remainder of a packet's journey through the system. FIG. 4B shows a series of consecutive packets passing through the de-concentrator unit. As soon as a packet passes through the de-concentrator, the switch that it passes through changes state. In this way, first node 402 toggles with every packet, and second nodes 404 toggle with every other packet. The logic in the unit is simple; timing signal 242 arrives at a node at the beginning of the dark gap. Upon receiving this signal, control logic 406 immediately toggles node 402, and slightly later, toggles the appropriate second node 404 In both cases, the switches change state immediately after a packet clears the switch.

Figure 5A:
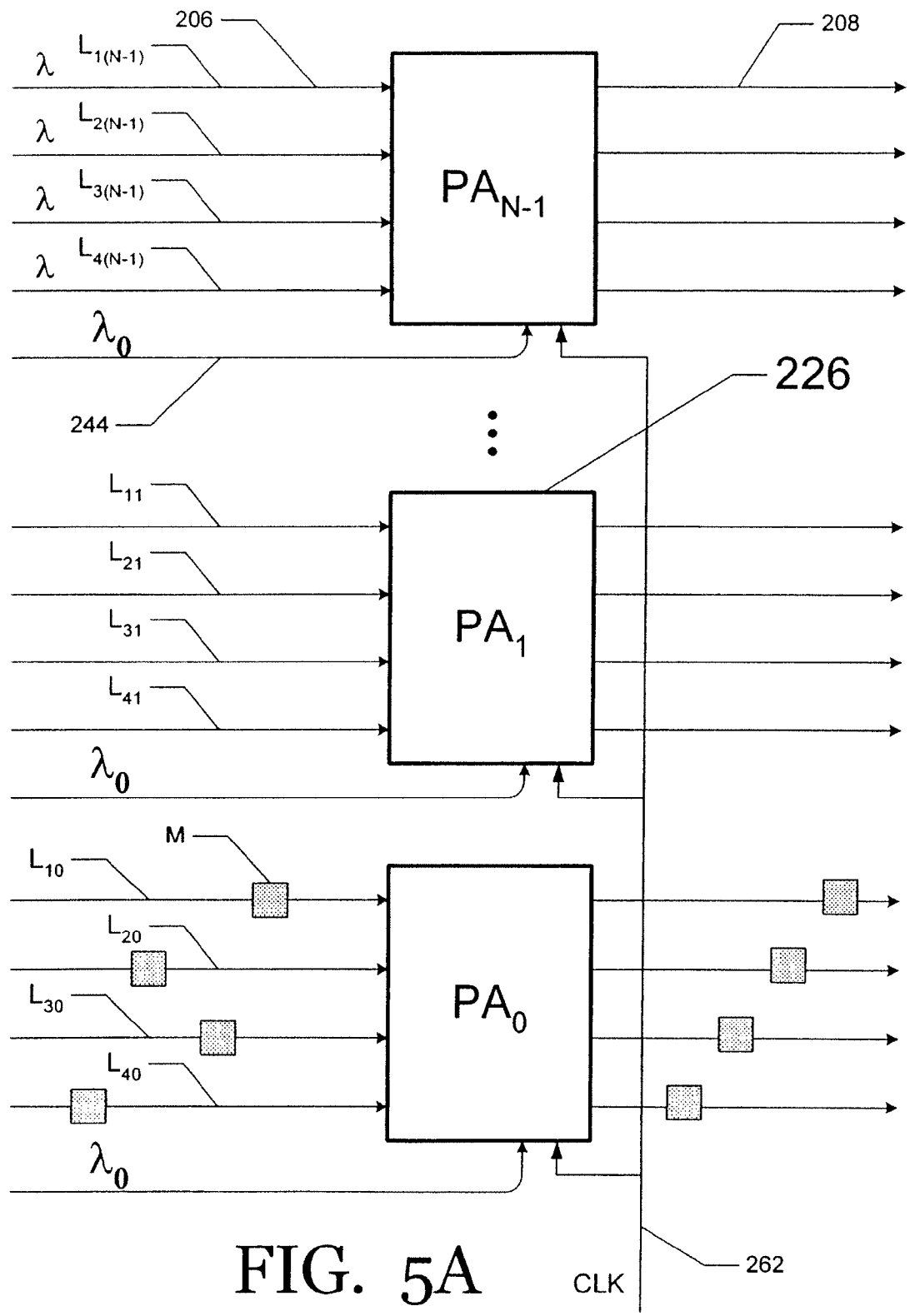
FIG. 5A is a diagram of a set of packet alignment units that accommodate asynchronous packet arrival.
Figure 5B:
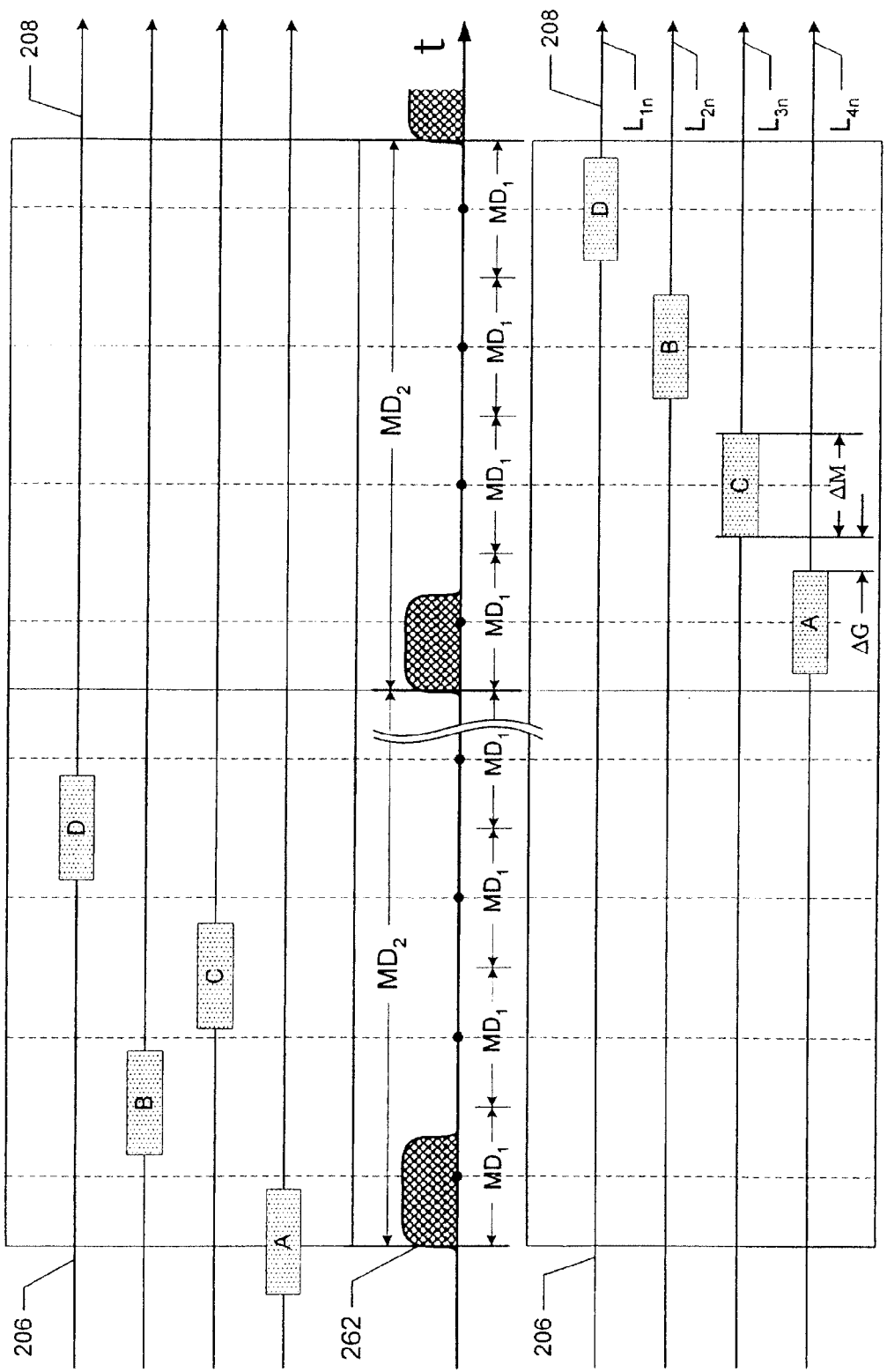
FIG. 5B illustrates the use of a reference signal for aligning packets.

Refer to FIG. 5A for a block diagram of packet alignment units (PA). The system has N alignment units 226, one for each port. Each PA is responsible for aligning a set of packets in reference to a system-global timing signal 262 as the packets arrive on internal lines 206 from the corresponding de-concentrator unit 224. FIG. 5B illustrates the application of global reference signal 262. Four packets, depicted as A, B, C, and D in the top half of the figure, arrive on internal lines 206 and are situated with respect to reference signal 262 as depicted in the top half of the figure. They are realigned and fine-tuned with respect to this signal and exit the alignment unit as illustrated in the lower half of the figure.

Figure 5C:
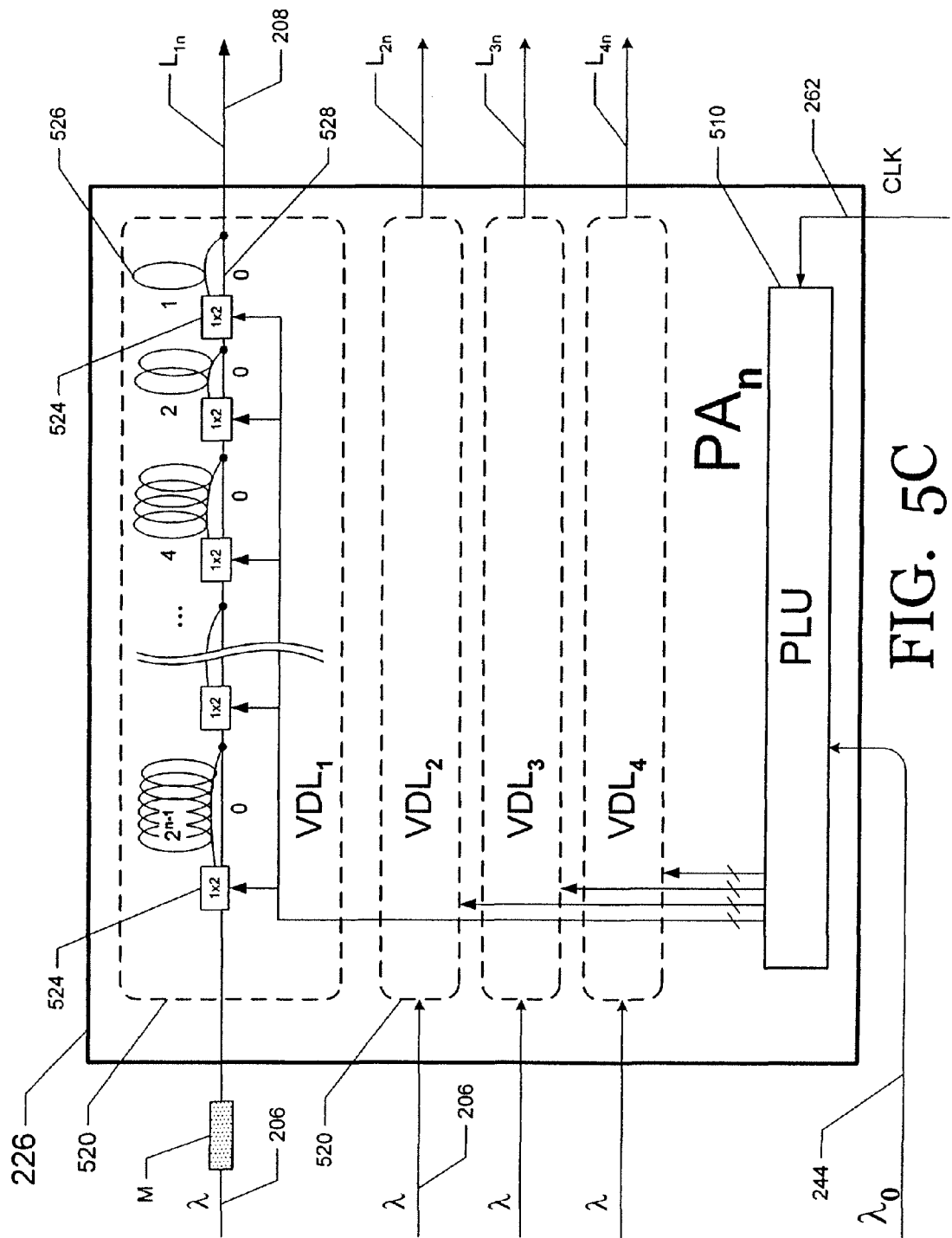
FIG. 5C illustrates in more detail how a series of delay loops are used to align packets on one of the K lines entering an alignment unit.
Figure 5D:
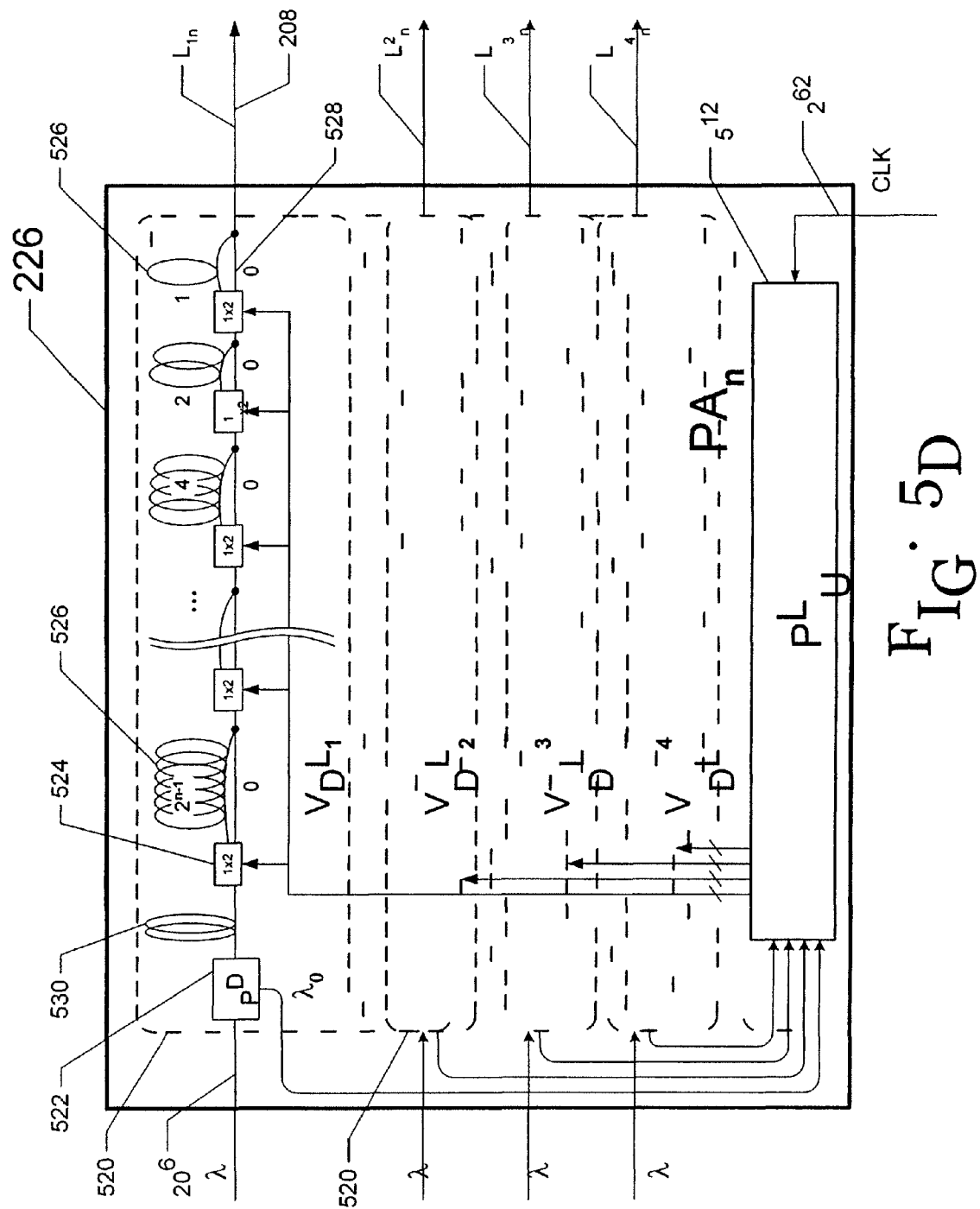
FIG. 5D illustrates a packet alignment unit with a packet detector for each input line. The switches described in the alignment and the re-sequencing units for the principle embodiment of the invention are lithium niobate gates or SOA (silicon optical amplifier) devices; an alternate embodiment employs tunable lasers or some other type of optical demux.

FIG. 5C is a diagram of packet alignment unit 226 that incorporates optical variable-delay devices along each path. The packet logic unit (PLU) 510 uses a timing signal from packet detector 222 sent to it on line 244. FIG. 5D is a diagram of an alignment unit with internal packet detector 522. For simplicity of illustration, only one of the four sets of delay loops (VDL) 520 is illustrated in detail; the others are identical in structure and function. An advantage of the FIG. 5C embodiment is that it requires only one header reader and one packet detector on a packet's end-to-end path. In this design, PLU 510 keeps track of the state of the de-concentrator switches in order to know on what line a packet is arriving. This is possible because the deconcentrator always switches in a predetermined pattern that is known by the alignment unit. An advantage of the embodiment illustrated in FIG. 5D is that PLU 512 may be simpler and there is less likelihood for jitter in the timing.

The FIG. 5D embodiment is presented here. Packets arrive at PA 226 on line 206. The packet-timing signal is obtained from internal packet detector PD 522 and sent to PLU 512. System-wide reference signal 262 connects to the PLU. Fixed delay loop 530 provides the PLU with enough time to determine how long to delay each of the four (or fewer) packets that arrive in a given cycle determined by $MD_2$. Based on the relative arrival time and the global timing signal, PLU 512 calculates how long to delay each packet so as to produce the relative alignment of exiting packets shown in FIG. 5A and sets nodes 524 accordingly. Variable delay unit 520 includes a serially connected set of optical delay loops 526 that can be switched in or out of the packet's path. When 1×2 switch 524 is set "low", a packet moves on zero-relative-delay path 528; when the node is set "high", the packet is delayed according to the length of each loop. In a model embodiment, the set of lengths of the loops are powers of 2 in this fashion: 1, 2, 4, 8, ..., $2^{n-1}$. Importantly, the total amount of delay obtained from VDL 520 ranges from zero to the sum of the set, which is ($2^n-1$) time units. A delay of one time unit is the smallest timing adjustment needed to satisfy internal system function and to meet external (downstream) timing requirements. The longest delay is approximately the time associated with four consecutive packets and the gaps between them. In summary, sets of packets on the internal line sets arrive asynchronously at their respective variable delay units 522. After processing by the alignment unit, all packets on all lines in the intelligent switching system are globally aligned with respect to reference signal 262.

Figure 5E:
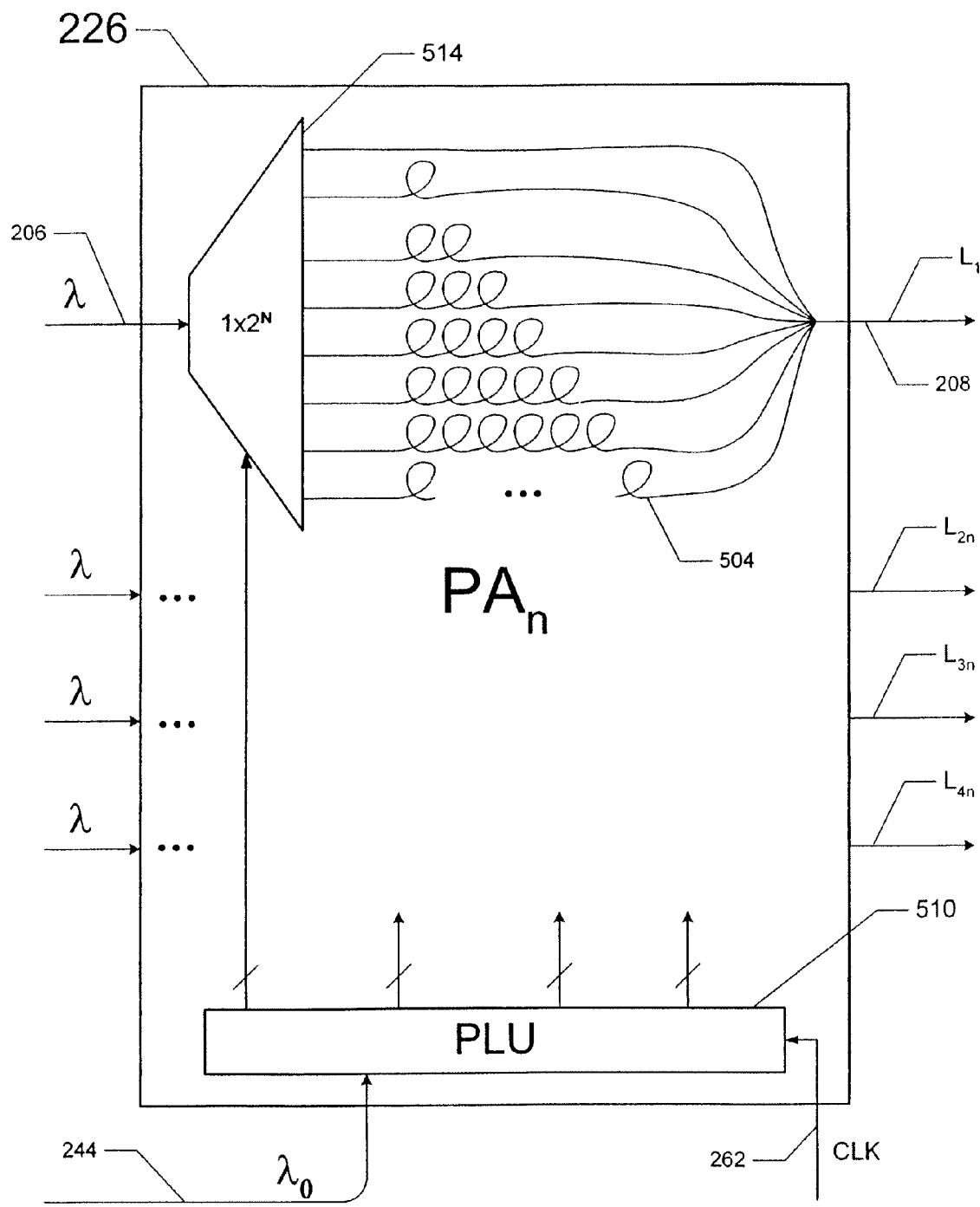
FIG. 5E illustrates an alternate packet alignment unit design.
Figure 5F:
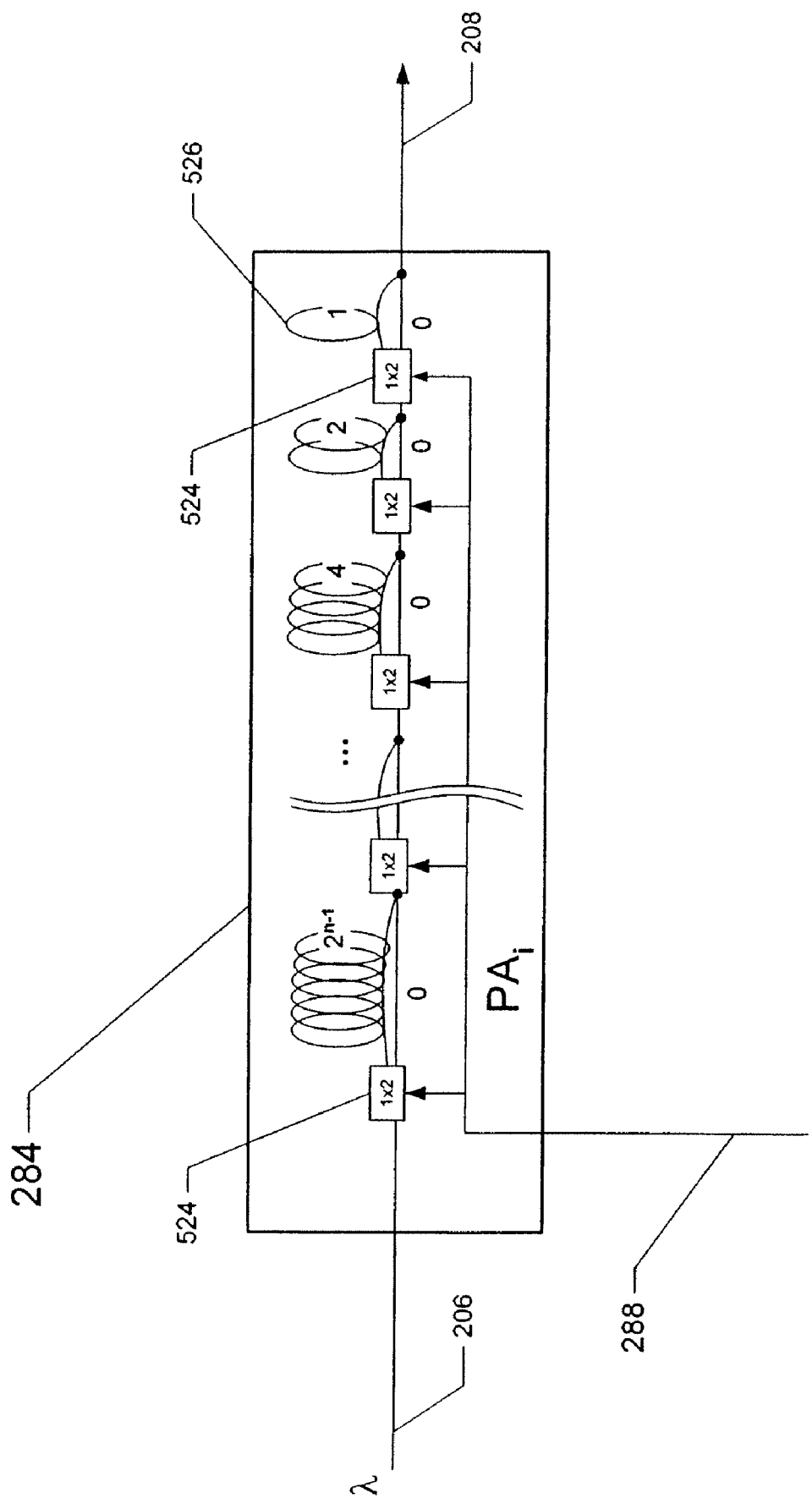
FIG. 5F illustrates a packet alignment unit, similar to that shown in FIG. 5C, which is directly controlled by electronic signals from an input port controller.

In another configuration (not illustrated), all four input lines for a unit could be managed by a single 4×32 switch. Using tunable lasers (or other demux-type node) for internal switching, the intelligent switching system could be constructed using three sets of the selected switch: one set for the alignment units, one set for the re-sequencing units, and one set for the packet switches. An alternate design for a packet alignment unit is illustrated in FIG. 5E and is discussed in the section entitled "Alternate Embodiments". FIG. 5F is a packet alignment unit, 284, that is similar in function to PA 520, except that unit 284 is controlled directly by electronic signals over lines 288 from input port controllers 724 (see FIGS. 2C and 7B).

Figure 6:
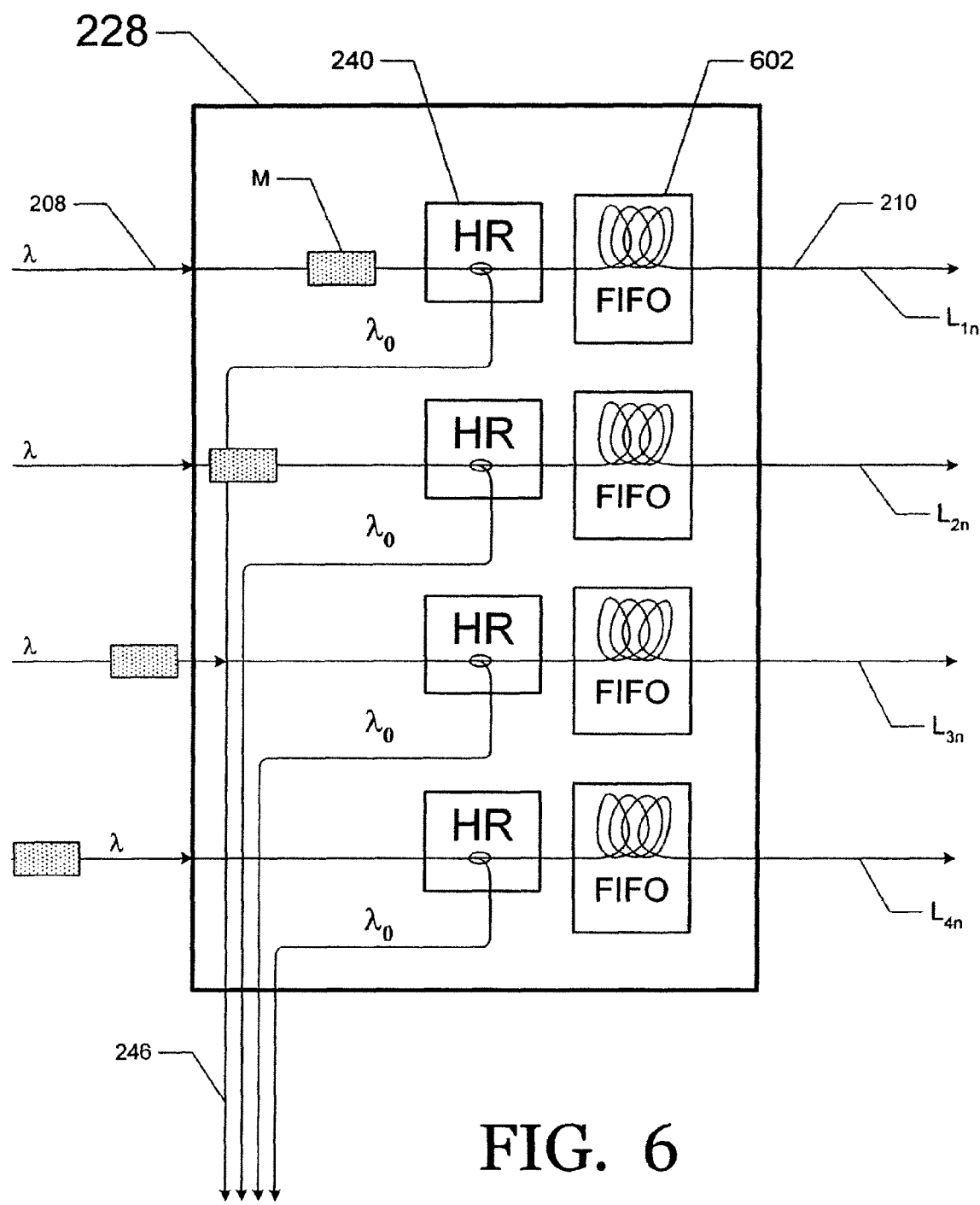
FIG. 6 is a diagram of a header reader unit with four input lines.

FIG. 6 illustrates a header reader and packet delay unit 228. Each unit contains a plurality of header readers and delay loops, one for each line 208 in its internal line set. Header reader 240 obtains an optical copy of the entire packet or, minimally, packet header 180 for immediate use by control system 260. A packet M enters on line 208 and exits on line 210 after passing through fixed delay loop 602. This loop is an optical FIFO (first-in, first-out buffer) that delays all packets for a time interval sufficient for control system 260 to perform all scheduling operations for a packet prior to its exiting the FIFO. An optical copy of the header information is sent via lines 246 to system control unit 260. Since all packets in the system have already been globally aligned (synchronized), they arrive at the header readers at times precisely determined by the global reference signal. During a given cycle determined by $MD_2$, sets of packets arrive at the header readers in the order $G_1, G_2, \ldots, G_K$ (Gn as previously defined), with a fixed time gap between each group. Header information 180 is read and sent to system control unit 260 in corresponding time-division-multiplexed groups $H_1, H_2, \ldots, H_K$, where $H_n$ is the set of header records from $G_n$. The header of a packet M includes the following data fields:

a timing bit (TB) 102 (or leading edge of the optical envelope) that is used to indicate that a packet is present and also to indicate the precise time of arrival of the packet;

a QoS field 106 that is used by the system logic control unit (SLC) to assign a packet priority (PP) to the packet; and information that can be used to ascertain a target output port (TOP) 104 for the packet.

These three fields, TB, QoS, and TOP, are used by SLC to generate and apply its control signals. SLC immediately converts the packet header from optical to electronic form (unless O/E conversion has already been performed) and obtains the content of header fields. In case each of the heater bits is on a separate wavelength, each header bit can be dropped using a chromatic filter or similar device. Otherwise, single-wavelength, serial O/E conversion can be employed. The packet header may contain other fields that are used by various embodiments of the intelligent switch. In particular, they may contain multicast bits.

Figure 7A:
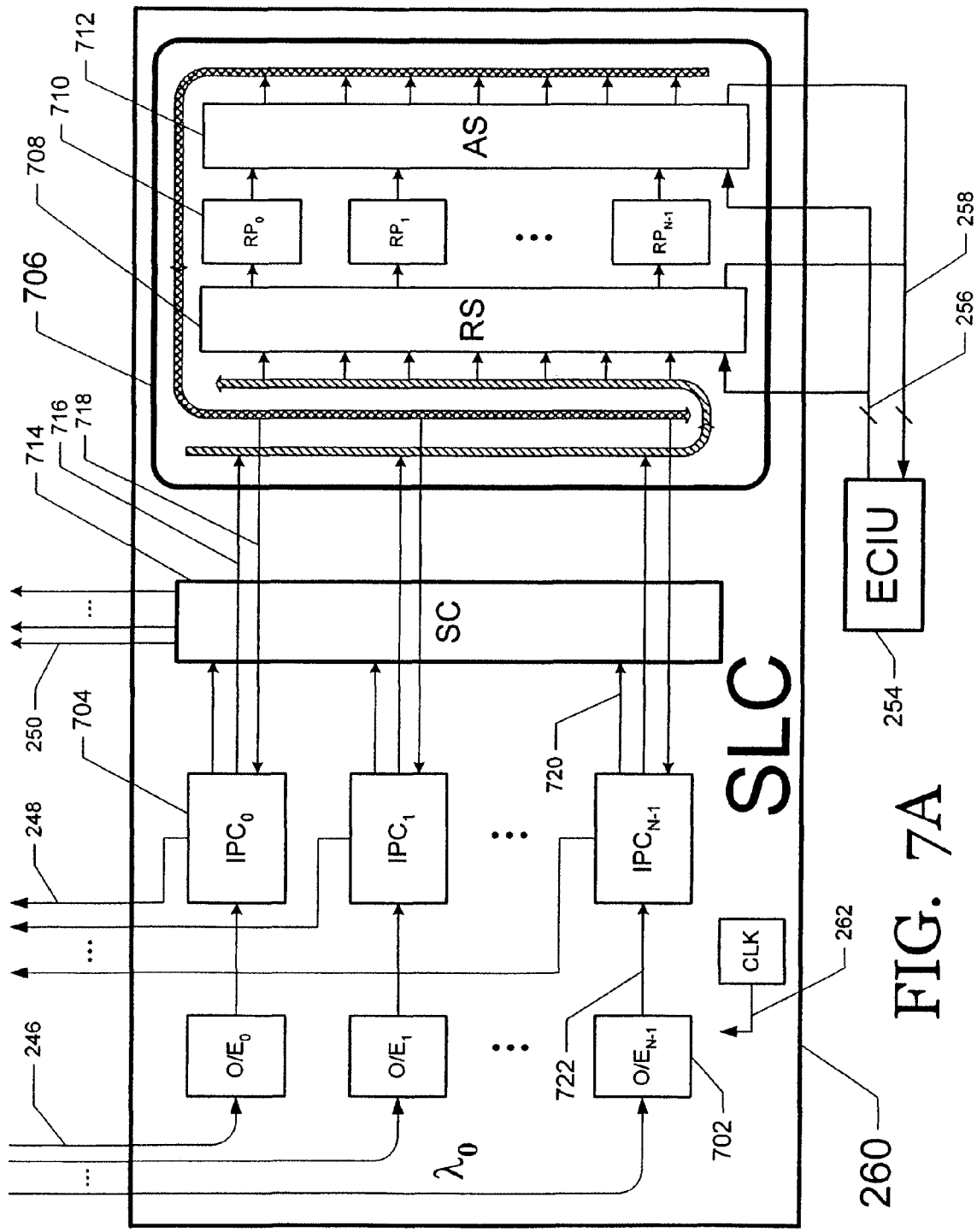
FIG. 7A is a block diagram of the system logic control unit, which operates in a scalable, parallel fashion. It collects information from all incoming packets, determines each packet's output port, and, importantly, determines how long to delay each packet before sending it into the packet switch, thus preventing packet collisions.

FIG. 7A is a schematic diagram illustrating the system logic control unit, SLC 260. A central idea in the present patent and in patents No. 8 and No. 10 is the scalable, intelligent control of all packets entering the switch fabric, taking into account current traffic rates and QoS requirements. The following is a summary of the means and apparatus for scalable control of a switching system taught in detail in these patents. A scalable control unit 706 (in conjunction with IPCs) schedules the timing of all packets entering switch(es) 232. In an application where scheduling strategy is based, at least in part, on QoS values, IPC 704 receives and processes header fields (including the QoS field) from all packets entering the system during each cycle. SLC 260 employs a scalable means and apparatus to determine at which time slot a given packet can enter optical packet switch 232 without colliding with any other packet. (A collision occurs when two or more packets are sent to a single output port at the same time.) A basic reason that the system management is so effective is that there is a logic unit (called a request processor RP) associated with each output port. RP considers all of the packets previously scheduled and currently wanting to use the output port and, given their priorities and timing, it schedules when each packet enters the packet switch, desirably preventing collisions. In order for RP 710 to be informed of all incoming packets scheduled for its port, it is necessary to route each request packet to the appropriate RP. The interconnect structures defined in patents No. 1 to No. 7 are self-routing and allow for multiple packets to be routed to the same target. Therefore, they are used here as request switch 708 for effective routing of the request packets to the desired request processors and also used as answer switch 712 for routing the answer packets from the request processors back to the input port controller that issued the request.

As illustrated in FIG. 7A, optical header information enters the system logic control unit 260 via lines 246, where it is converted to electronics by O/E converters 702 and then sent via lines 722 to its corresponding input port controller (IPC) 704. The IPC performs line-card functions including header lookup and other traffic management functions. For each header received and parsed, the input port controller builds a request packet 130 and sends it via line 716 to the request system 706, which is similar in construction and function to those taught in patents No. 8 and 10. Sets of headers arrive at system control unit 260 in cycles determined by the global reference signal and in the order $H_1, H_2, \ldots, H_K$. For each k such that $1 \leq k \leq K$, the packets associated with the headers in $H_k$ are in $G_k$ and thus are on the set of lines $L_{kn}$ ($0 \leq n \leq N-1$). Moreover, these packets are destined for packet switch $PS_k$ 232. During each request/approval cycle, an input port controller submits a single request for only one switch and receives a single answer from a request processor. The switch number and the packet ID are identified by knowing which set of headers is being processed. Input port controllers are also aware of the time at which each packet will exit the FIFO and enter the re-sequencing unit. In the request packet, an input port controller gives a list, AVT 114, of all available times for inserting the associated packet into the proper packet switch 232. The AVT times are based on the packet being sent either straight through the re-sequencing unit or else through a set of delay loops within this unit. When an answer packet 140 for a request is received, the input port controller updates its AVT list and sends re-sequencing command 150 via line 248 to the re-sequencing unit at the appropriate time. The re-sequencing command is sent to and arrives at RS 230 just prior to the packet's exit from the FIFO 602 in the header reader; thus, the logic in the re-sequencing unit has time to set the appropriate switches. The RP updates its internal AVT based on packets it scheduled in the current cycle.

Each request processor 710 controls the flow of packets into the packet switches. Based on information such as QoS and load on the target output port, a request processor selects an available time slot and returns it as TS 122 in an answer packet 140 (via the answer switch AS 712 and line 718) to the input port controller that sent the request. In some cases, it may be necessary to discard the packet. In one embodiment, during each request cycle, request packets are received for only one packet switch 232. Upon receipt of an answer packet by an input port controller, the IPC knows when to send its packet into the packet switch, and thus knows the required delay for the packet. When a packet is approved by a request processor, it also sends switch-setting information for the packet via line 720 to the switch controller SC 714, either directly or via an input port controller. SC collects switch setting information from all of the request processors and organizes it by switch injection time. Just prior to a set of packets arriving at switches 232, SC sends the appropriate switch-setting information on lines 250 to set the crossbar nodes 902.

Referring to FIGS. 6 and 7A, in an alternate embodiment, O/E converter 702 is located in header reader 240 (rather than in SLC 260). In this embodiment, lines 246 carry electronic signals. This embodiment advantageously reduces the amount of optical plumbing in the system, replacing it with low-cost, high-speed serial communications technology.

SLC 260 determines the delay time per packet for all packets, where one time unit $MD_2$ consists of the time associated with one packet plus its minimum inter-packet gap on a "de-concentrated" line. The outcome of the SLC is the determination of how much time each packet must wait before it can enter packet switch 232, desirably avoiding collisions, while taking into account current traffic rates and QoS demands. Input port controller 704 is the final device in this process of determining the delay for a packet that has arrived at its associated input port. Importantly, the packet is moving through the FIFO during the time it takes to determine its delay value. Immediately before the packet exits FIFO 602, the input port controller informs the re-sequencing unit how long to delay the packet. Alternately stated, re-sequencing unit 230 can be thought of as a set of fixed delay lines terminating at the same point. For example, packets may enter the system in the order A, B, C, D, E, and F, and exit in an arbitrary sequence, such as C, F, B, D, A, and E. In this example, packet A is delayed eight periods longer than packet F.

Figure 7B:
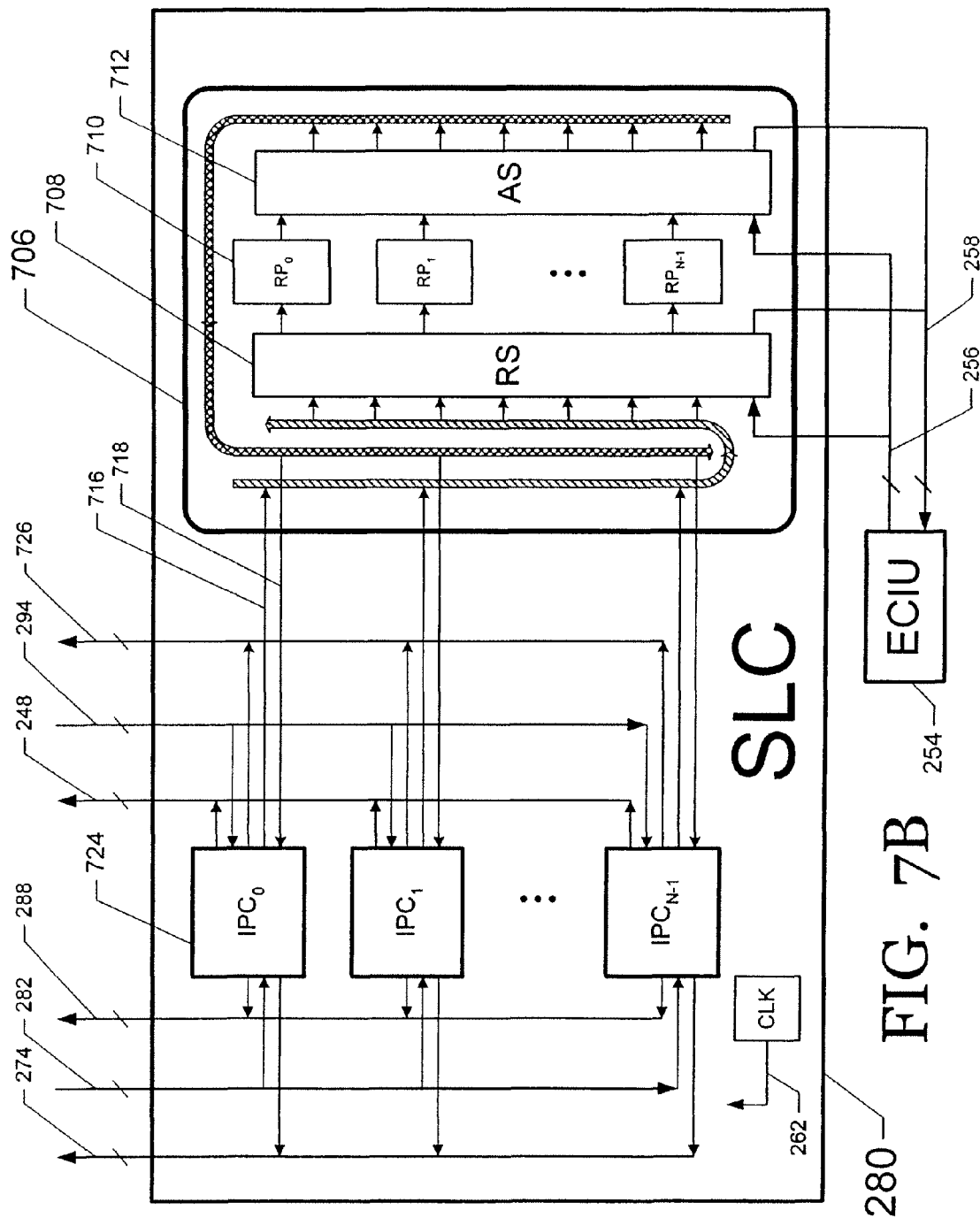
FIG. 7B is a block diagram of an alternate embodiment of a system logic control unit that uses electronic signaling lines wherever possible and employs an optical feedback capability for ongoing performance management and system tuning.

Referring to FIGS. 7A and 7B, the external control and interface unit (ECIU) 254 serves at least two functions. First, it has two-way communication with all processing element in the system, including IPCs 704 (FIG. 7A) or 724 (FIG. 7B), and RPs 710. Second, it is the interface between the system and the external world, for purposes including administration, operation, maintenance, performance measurements, and diagnoses.

Figure 8:
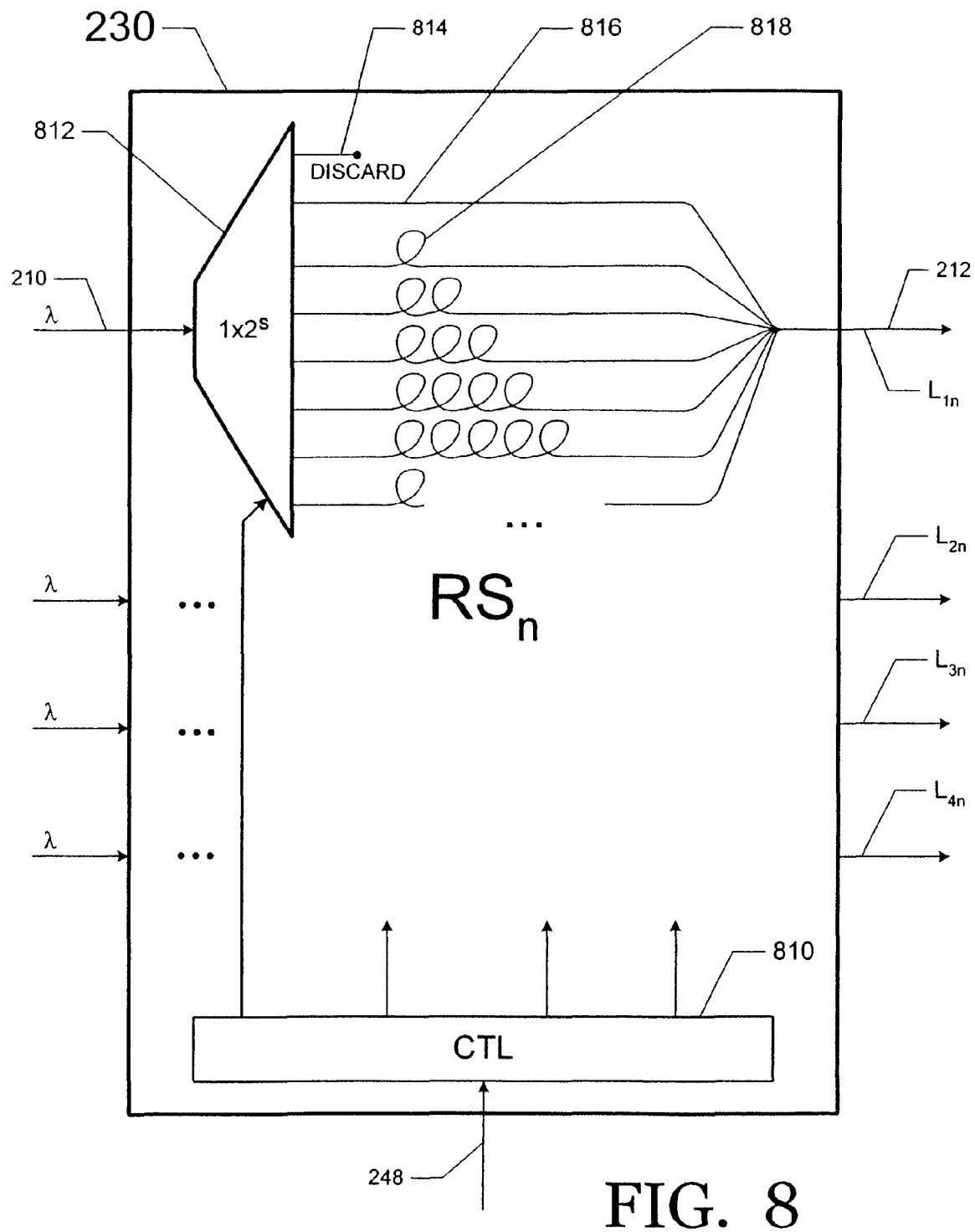
FIG. 8 is a diagram of a packet re-sequencing unit in which each packet is delayed an amount determined by the system control logic. Thus, the set of arriving packets are individually delayed and re-sequenced before being sent through the optical crossbar switch, desirably such that no packet collides with any other packet in its journey through the system.

Refer to FIG. 8 for a schematic diagram of packet re-sequencing unit 230. When a re-sequencing packet is received from SLC 260 on line 248, it is processed by the control unit CTL 810. Immediately prior to a packet arriving on line 210, re-sequencing packet 150 informs CTL 810 of the line number and the desired delay. CTL sets switches in demux 812, which may be implemented as a binary tree of 1×2 nodes in an arrangement such as indicated in FIG. 4A or by another suitable optical demux design. Demux 812 has a plurality of outputs. Output 814 causes the packet to be discarded, which could occur when the packet's output port is overloaded with traffic and the packet has a low QoS value. Output 816 connects on line 212 to the crossbar without delay. The length of each delay loop 818 is $MD_2$. Accordingly, other outputs of the demux unit delay packets in integer multiples of $MD_2$.

Figure 9A:
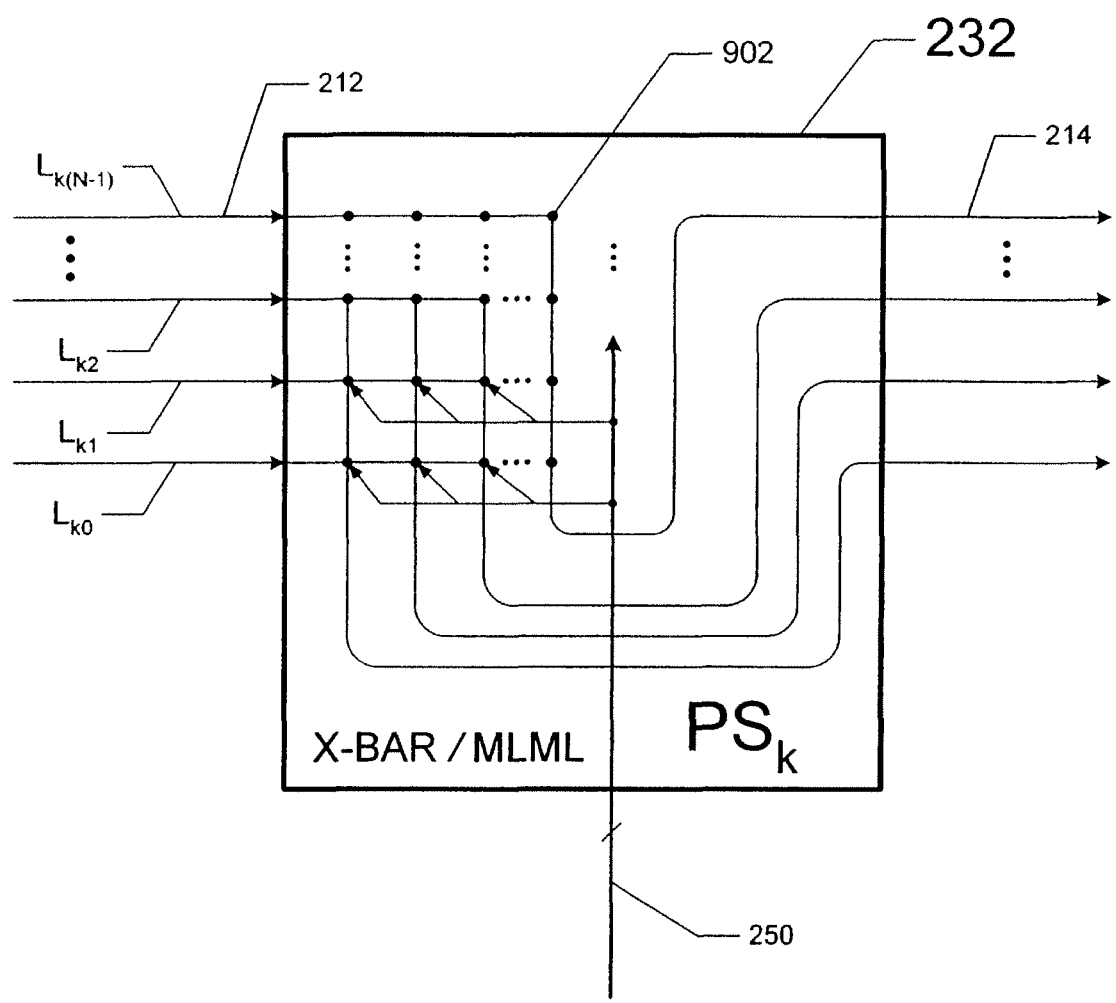
FIG. 9A is a diagram of a crossbar-type packet switch that is suitable for use in the intelligent switching system.

FIG. 9A illustrates a crossbar packet switch 232 suitable for use in the intelligent switching system 200. Crossbar packet switch 232 receives packets on lines 212, sends packets out on line 214, and receives switch setting information on lines 250. The crossbar nominally contains $N^2$ nodes. Node 902 makes an optical connection from an input line to an output line. According to the operation of control system 260, an input connects to zero or one output line, and one output is connected to zero or one input line. In the embodiment being described, the system contains K packet switches 232, one switch for each line that exits a de-concentrator unit. Packet switch $PS_k$ 232 receives and switches all packets arriving on the set of lines $L_{kn}$, where $1 \leq k \leq K$ and $0 \leq n \leq N-1$. In the illustrations for the system 200, K=4 and thus, $PS_1$, switches packets from the set of lines $L_{1n}$, $PS_2$ switches packets from the set of lines $L_{2n}$, $PS_3$ switches packets from the set of lines $L_{3n}$, and $PS_4$ switches packets from the set of lines $L_{4n}$. In other embodiments of the switching system, the number of packet switches may be a number different from K. Suitable switches may be of several types:

optical crossbar switches;
crossbar-like N×N switches in which each input port is capable of choosing one of N wavelengths to send its data and each output port is tuned to accept only one of the wavelengths, with each output port accepting a different wavelength; or
optical MLML switches as described in the referenced patents.

MLML switches may be self-routing or may be optical slaves to electronic MLML networks within the switch controller 714 (as described in patent No. 2). In case an MLML switch is employed, it is useful to attach optical delay lines of various lengths to the outputs of the innermost rings. The delay lines for all of the nodes at a single angle are equal. In this way, all of the packets are realigned after emerging from the system composed of the MLML network and these delay lines.

Figure 9B:
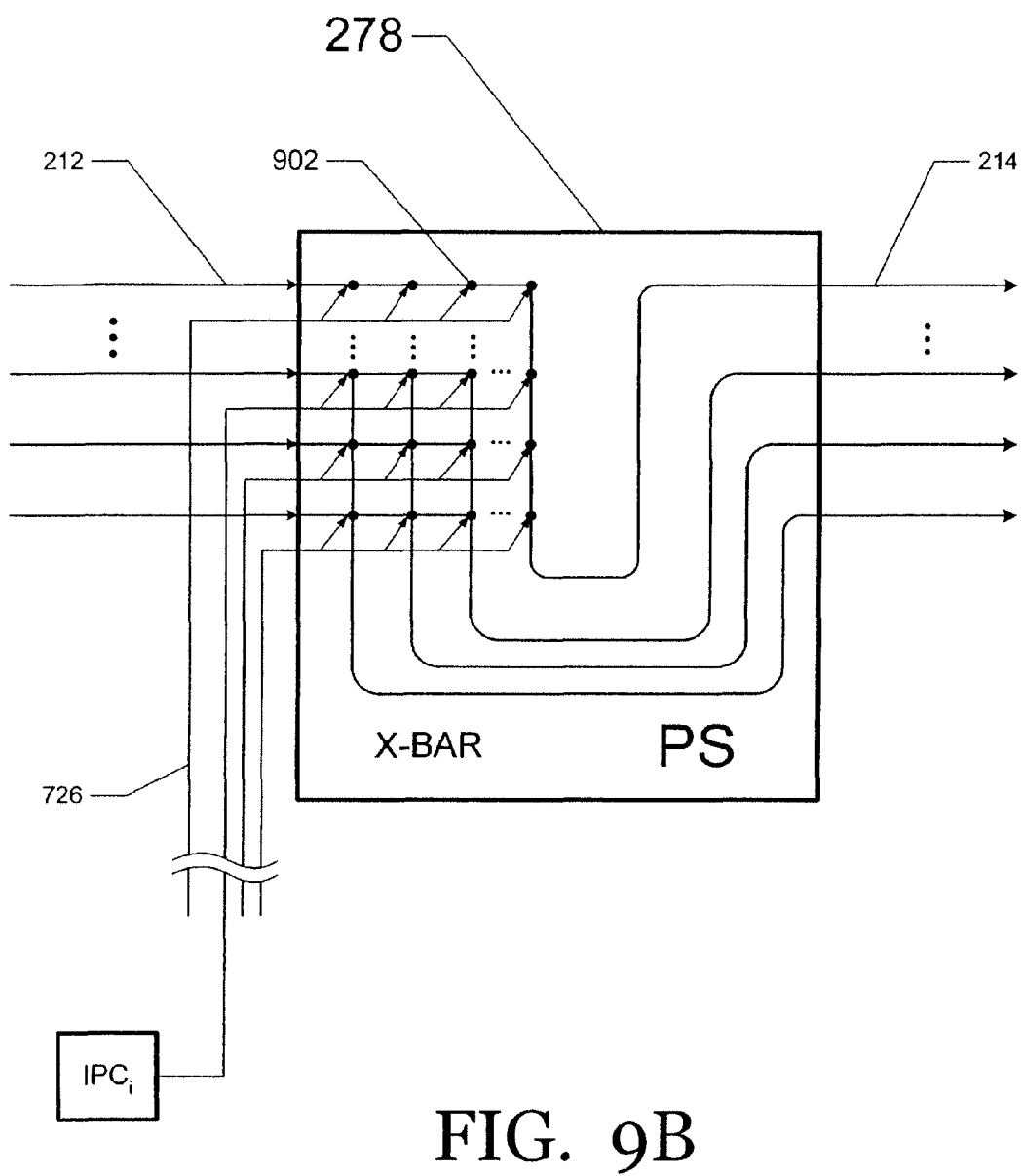
FIG. 9B is a diagram of a cross bar to type packet switch where each IPC sets its connection to an output port.

FIG. 9B illustrates a crossbar packet switch 278 where input-to-output connections are set by means of a signal connected to each input port of the crossbar. It receives packets on lines 212, sends packets out on line 214, and receives switch setting information directly from the input port's associated IPC on line 726 (see FIGS. 7B and 2C). The crossbar nominally contains $N^2$ nodes. Node 902 makes an optical connection from an input line to an output line. According to the operation of control system 280, an input connects to zero or one output line.

Figure 10:
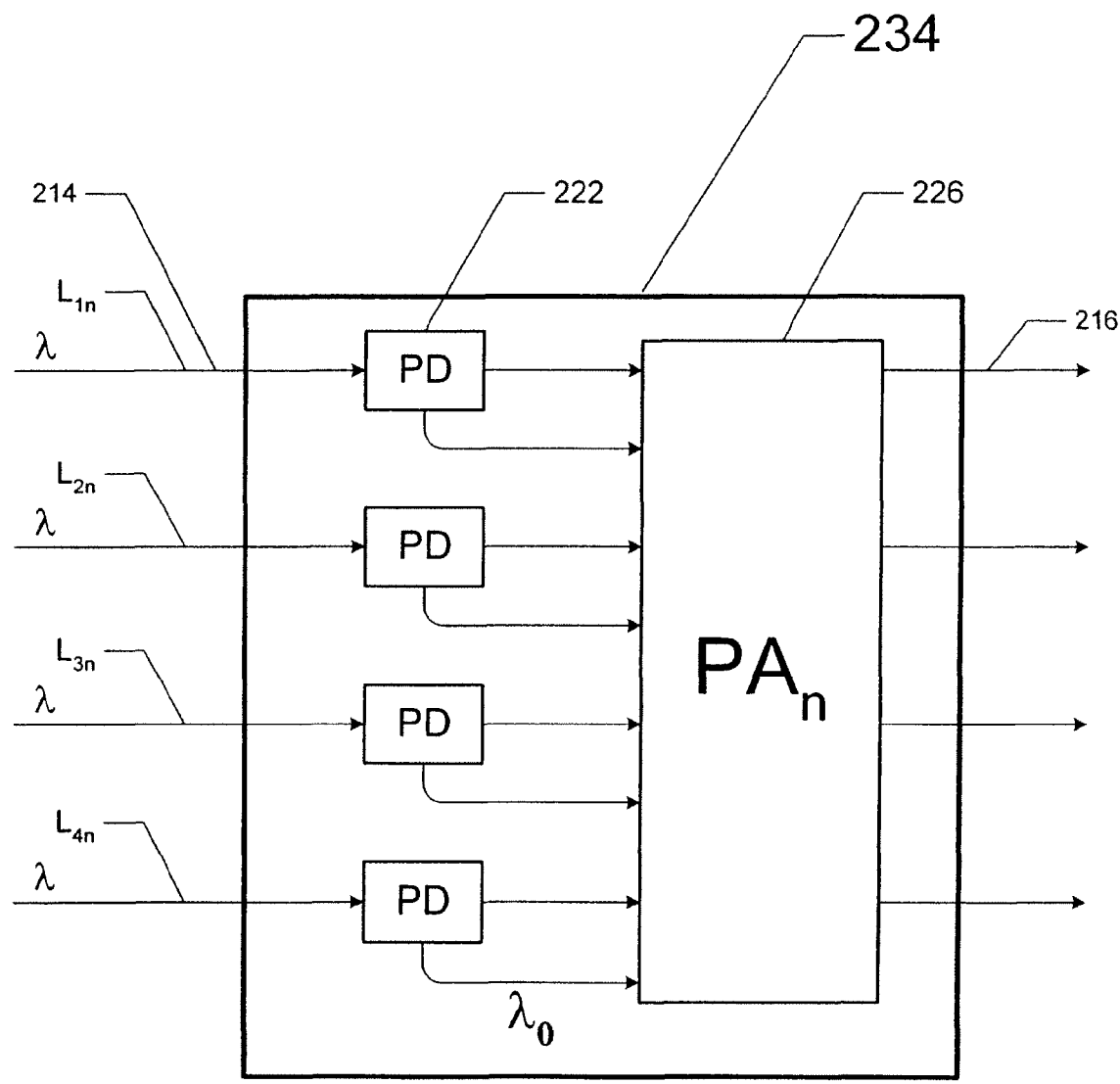
FIG. 10 is a diagram of a packet alignment unit (with a packet detector unit at each input line) that applies a small timing adjustment to each packet to align it for the final concentrator operation.

FIG. 10 illustrates an additional packet alignment unit 234. This unit is similar in construction and function to the alignment unit 226 illustrated in FIG. 5A. Each input line 214 contains a packet detector unit 222, which sends each incoming packet through a delay loop while sending a timing signal to the corresponding alignment unit 226. Whereas first alignment unit 226 could be somewhat course in aligning the packets, the purpose of final alignment unit 234 is to perform a finer alignment that is required prior to the concentration process.

Figure 11:
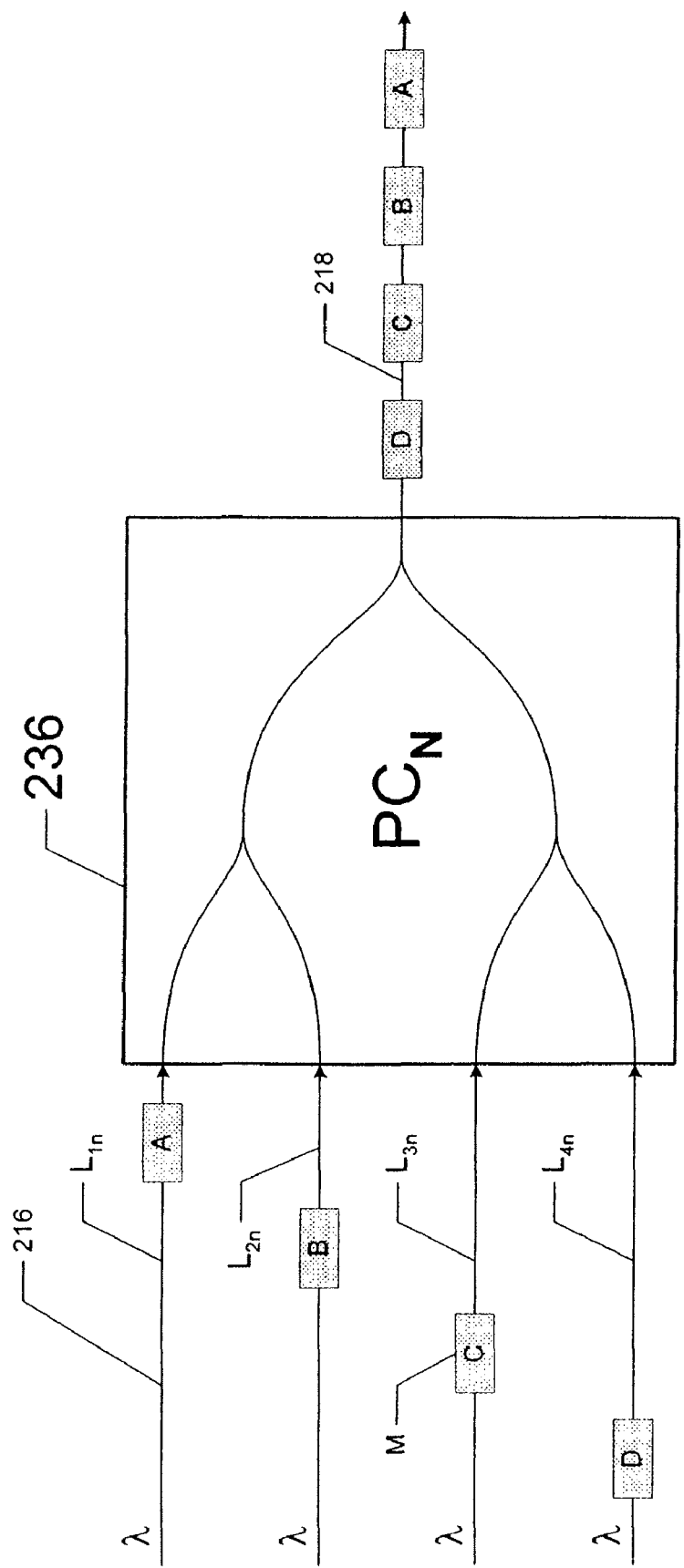
FIG. 11 is a diagram of a packet concentrator unit, where a plurality of optical input connections is merged into a single output for downstream transmission.

FIG. 11 is a schematic diagram of a packet concentrator unit 236. Four optical lines 216 enter the unit and combine signals until all packets exit on a single fiber. Since the packets have been aligned with respect to a global reference signal, no two input lines send packets into the concentrator at the same time. Importantly, a minimum dark space ΔG is always maintained between packets sent downstream. Packets exit the concentrator and the switching system on lines 218. A final optical amplifier, such as shown in FIG. 2C, may be needed here.

ALTERNATE EMBODIMENTS

If packets entering the system on lines 202 were spaced sufficiently far apart or if low-cost high-speed 1×2 switches are available, then the deconcentration unit 224 is not be required. An embodiment of the invention with this property is illustrated in FIG. 2B. In FIG. 2B there are N lines entering the intelligent switching system, N lines internal to the system, and N lines exiting the system. Since the de-concentration step has been eliminated, this embodiment does not contain the following units that are illustrated in FIG. 2A:
the de-concentrator unit 224;
the additional packet alignment unit 234; and
the packet concentrator unit 236.

Thus, packets exit this system directly from the packet switch 232 on lines 220.

Another embodiment, 205, of the invention, shown in FIG. 2B, packets sent to the system on lines 202 are timed with a world-wide global clock. Thus, packets arriving on each input line would be evenly spaced on that line, and this spacing would be uniform on each of the N input lines. In an ideal situation of this type, once the switch settings in the packet alignment units 284 are determined for aligning the initial set of packets on the N input lines, these setting would remain the same for all future arriving packets. In one embodiment, however, the arrival of the packets is monitored and some minor adjustments to the alignment switches is made, if only on an infrequent basis.

FIG. 5E illustrates a packet alignment unit 226 that uses optical demux 514 such that a packet passes through one of a plurality of optical delay lines 504 before exiting. Accordingly, the optical packet is delayed over a range determined by the longest delay line, with timing increments related to the number of delay loops in the chosen line.

In another embodiment, the design given in FIGS. 2C, 7B and 9B uses electronics whenever possible, thus reducing the amount of optical fibers, connectors, and other optical devices. System 270 incorporates these features:

All inter-unit signaling components and control units, including cabling, connectors, and circuit board components, employ low-cost, high-speed OTS (off the shelf) electronic transmission technologies wherever practical or economically warranted.

There is only one fixed-delay loop FDL 276 per end-to-end path through the system, and O/E conversion of optical header contents to electronic form is performed early, and only once per packet, at OE unit 272.

Packet header content is sent on electronic communication line 282 to the system logic control system (SLC) 280.

SLC receives immediate notification of packet arrival and determines all timing, aligning, and re-sequencing settings for all packets.

There is only one packet alignment device, 284, per path, which is similar in function to variable delay unit 520, except that control signal 288 is generated by input processor control unit (IPC) 724, taking into account factors already mentioned as well as end-to-end timing measurements for all paths and components the packet may use.

Re-sequencing of packets is performed by re-sequencing unit (RS) 230, which is similar in function to the re-sequencing unit of FIG. 8.

FIG. 9B illustrates optical crossbar switch 278. The switch is controlled directly by the set of IPCs. An IPC uses signal line 726 to control the single input port associated with that IPC. It sets one node, 902, on input line 212 to make an optical connection to one output line 214. (When there is no packet, no connection is made.)

IPC 724 can command its associated test-packet generator (TP) 296 to generate an optical test packet and inject it into the front end for testing the end-to-end operation of any optical path originating at its input port, and thus, obtain precise timing information for any such path. A command to the test-packet generator is sent over line 274 from the input port controller.

Optical packet feedback tap (OFB) 292, located at an input port of the packet switch, informs IPC 724 the of successful transmission and precise arrival time of a packet through the series of 1×2 switches and delay lines between the system input from line 202 and the input into the data switch from line 212. Optical encoder (OE) 272 provides the precise time of arrival of a packet (including a test packet) entering the system. Signals from OFB and OE provide precise timing measurements of a packet that passes through the system, advantageously providing the control system and the IPC with information needed for fine tuning of timing during operation, and eliminating the need for additional alignment steps. Faults and failures in the optical plumbing can be identified in this manner as well. Test packets generated by optical identified in this manner as well. Test packets generated by optical packet generator 296 provide timing information during system setup, maintenance, and normal operation.

OFB 292 signals the control system over electronic line 294. The signal shows of the successful end-to-end transmission and precise timing of normal packet traffic through the system, thus permitting fine-tuning of timing and alignment during normal operation. This process allows the system to adjust for temperature effects on optical fibers that occur during ongoing system operation, as well as make adjustments for other effects.

OFB 298 is located at the final output of the switch, which advantageously informs the system logic control system of the successful witching and precise timing of a packet through the entire system, including packet switch 278. In one use of OFB 298, a "target" IPC ($IPC_T$) sends an I/O message 160 to a "sending" IPC (IPCs), requesting that IPCs generate an optical test packet (TP) and send it to the output address of $IPC_T$. IPCs uses OFB 292 to determine time, $t_{IN}$, when TP enters the switch. IPCs sends an I/O message to $IPC_T$, which includes the time ($t_{IN}$) that TP entered the data switch (along with other information to identify S, T, the nature of the message, and the expected time packet TP will arrive at output T). $IPC_T$ uses OFB 298 to determine the precise time, $t_{OUT}$, that TP exited the switch; it then determines the delay between ports S and T: $t_{ST}=t_{OUT}-t_{IN}$. This timing measurement is sent back to IPCs so that it can make fine-tuning adjustments when sending a packet to $IPC_T$. Alternately, processor T can simply send the timing value back to IPCs by means of an I/O message. IPCs uses this value to determine $t_{ST}$. In the case where S=T, IPCs uses its connections to input OFBs 292 and output OFBs 298 to measures $t_{SS}$.

In an operation where the target address T is cycled through all port numbers, IPCs generates and updates an internal timing table for all outputs. By these means and methods, the timings and delays of all components in the system can be measured. An IPC uses this information to determine how to set packet alignment units in order to make fine-tuning adjustments. An IPC can generate a suite of test packets sent into a plurality of input ports to check overall system performance and to measure the timing parameters of individual components, fibers, and connections. It may initiate this process autonomously as part of its normal operation, or it may be commanded by the ECIU. The ECIU can command an input processor (S) to send a test packet to a target processor (T) to initiate the sequence just described; the result, $t_{ST}$, is sent back to the control system for ongoing maintenance and operations purposes.

Other uses of OFB include component failure detection, and other operational and maintenance functions in conjunction with ECIU 254.

Optical amplifier (OA) 286 amplifies the signal for purposes that include increasing signal strength for downstream transmission and improving the optical signal to noise ratio. Optical amplifiers are placed at a plurality of locations along the optical paths to appropriately maintain signal amplitude and signal to noise levels.

Referring to FIGS. 2A, 2B, 2C, 7A and 7B, external control and interface unit (ECIU) 254 has connections to all IPCs and RPs in the system. ECIU has a plurality of connections 256 to input ports of request switch 708 and a plurality of connections 258 from output ports of request switch 708, and thus can send an I/O packet to any RP and receive one from any IPC. Similarly, ECIU has a plurality of input and output connections to answer switch 712, and thus can send an I/O packet to any IPC and receive an I/O packet from any RP. Uses of this connection capability include:

setting up and changing parameters for the operation of IPCs;

setting up and changing algorithms for the operation of IPCs;

receiving notification of normal operation and traffic conditions from IPCs and RPs on a timely or periodic basis;

setting up and changing parameters for the operation of RPs;

setting up and changing algorithms for the operation of RPs;

receiving traffic-flow information from RPs during operation;

receiving timely and urgent notification of exceptional operation or traffic conditions from IPCs and RPs, e.g. failure of a component such as a 1×2 optical switch, an optical fiber or connection, or an electronic line, connection or component;

ECIU can command a specific IPC to generate test packets for testing, initialization, diagnosis, troubleshooting, and fine-tuning operations;

any RP can send an I/O packet P to any IPC (where packet P is not an answer packet 140);

any IPC, S, can send an I/O packet P to a target IPC, T, by sending the packet through an RP, which forwards P to IPC T; similarly, any RP can send an I/O packet to another RP by sending it to an IPC, which forwards P to the target RP.

One use for IPC-to-IPC communications is to generate an optical test packet and use it to gather timing information for paths from one port to another. One use for RP-to-IPC communication (in addition to its primary answer-packet function) is to inform an IPC of exceptional conditions such as excess traffic for the output address associated with the RP. In general, an IPC has greater processing capabilities than an RP. An IPC analyzes the traffic information and can inform the ECIU, which has yet greater processing and analysis capabilities and can use the information in managing the system. ECIU functions include operator interface, maintenance, diagnosis and troubleshooting, collecting and analyzing traffic data, putting ports online and offline, and managing user requirements such as QoS service for different traffic types and different ports. By these means and methods, any processing element in the system has a high-speed connection to any other, which is an advantage of the parallel, scalable nature of all communications in the system.

Figure 2D:
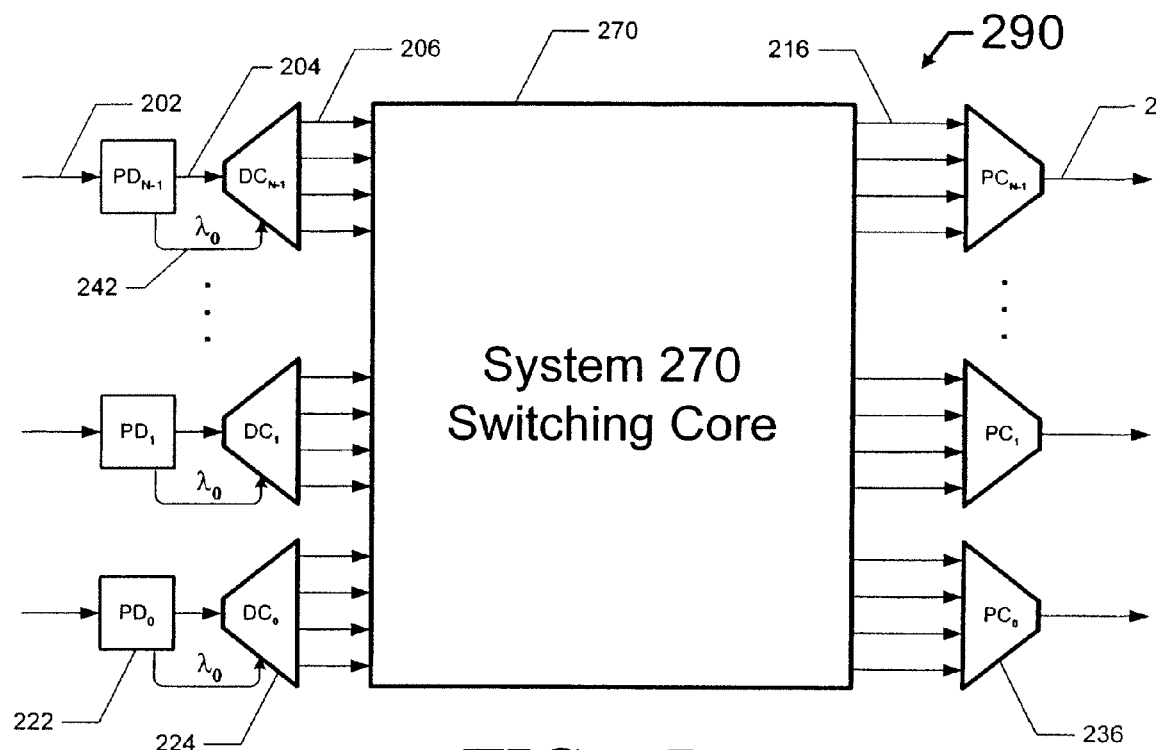
FIG. 2D illustrates an alternate embodiment that employs the system of FIG. 2C as its "switching core".

System 270 (FIG. 2C) can be employed in a system 290 (FIG. 2D) similar to the system 205 shown in FIG. 2B, where input 202 connects upstream and output 220 connects downstream. In an alternate embodiment of this type, system 270 can be employed as the "switching core", using packet de-concentrators 224 and concentrators 236 in a fashion similar to their use in system 200 as shown in FIG. 2A. In this embodiment lines 206 from the de-concentrator are the input to system 270 and lines 216 are the output from system 270, connecting directly to packet concentrators 236. Advantageously, the system 200 packet alignment unit 234 is not needed because SLC 280 uses optical feedback 292 in conjunction with a single packet alignment unit 284 to fine-tune the timing of packets so that a second alignment/adjustment step is unnecessary.

In yet other embodiments of systems 200 and 205, test-packet generator 296, optical feedbacks 292 and 298, and SLC 280 can be suitably incorporated for purposes and uses mentioned above, including system installation, setup, reconfiguration, operation, management, system analysis, diagnosis, and repair functions.

Other embodiments of the invention could combine the ideas taught in this patent with the ideas taught in referenced patents No. 8 and No. 10. For example, some of the input or output lines of the system could be electronic. In another embodiment, some of the data is switched optically, while other data is switched electronically. One skilled in the art will be able to see other variation of this scenario by combining ideas in the referenced patents.

The invention claimed is:

1. A method of transparent packet switching comprising: detecting headers of arriving packets;

sending the header information to at least one logic unit;

receiving the packets at a de-concentrating units with a de-concentrating unit having more output lines than input lines;

realigning the packets on the de-concentrator output lines; comparing the headers of the packets;

utilizing header information for selecting a particular time for a packet to enter a switch wherein the headers of the packets are compared based on quality of service and previous scheduling of packets to exit switch output ports.

2. The step of switching according to claim 1, wherein the switching is electronic.

3. The step of switching according to claim 1, wherein the switching is optical.

4. A transparent optical switching system consisting of a plurality of incoming lines, a plurality of outgoing lines, and a plurality of optical switching units $PS_1$, $PS_2$, . . . $PS_K$ wherein:

data as optical packets enter and leave the transparent optical switching system;

the amount of time necessary to switch an optical switching unit $PS_j$ is less than the amount of time between packets entering the switch;

the packets entering the transparent optical switching unit are de-concentrated and placed on de-concentrated lines;

the amount of time between two packets on a de-concentrated line exceeds the amount of time necessary to set an optical switching unit $PS_j$;

a packet entering the transparent optical switching system passes through an optical switching unit $PS_j$ to the target output port of the packet.

5. The transparent optical switching system in accordance with claim 4 wherein a packet alignment unit re-aligns the packets so that a group of packets simultaneously enter an optical switching unit $PS_j$.

6. The transparent optical switching system in accordance with claim 4 wherein there is a packet re-sequencing unit that re-sequences the packets so that two packets entering an optical switching $PS_j$ at the same time are targeted to different output ports of $PS_j$.

* * * * *